United States Patent [19]

Dilts et al.

[11] Patent Number: 5,455,854
[45] Date of Patent: Oct. 3, 1995

[54] OBJECT-ORIENTED TELEPHONY SYSTEM

[75] Inventors: Michael R. Dilts, Saratoga; Steven H. Milne, Palo Alto; David B. Goldsmith, Los Gatos, all of Calif.

[73] Assignee: Taligent, Inc., Cupertino, Calif.

[21] Appl. No.: 108,877

[22] Filed: Oct. 26, 1993

[51] Int. Cl.⁶ .......................... H04M 3/42; H04M 11/00; G06F 1/00
[52] U.S. Cl. .................... 379/201; 379/94; 364/DIG. 1; 395/62; 395/159; 395/917
[58] Field of Search .................. 379/93, 94, 201, 379/207; 364/200; 395/159, 160, 161, 500, 51, 75, 917, 922, 61, 62, 700

[56] References Cited

U.S. PATENT DOCUMENTS

| | | | |
|---|---|---|---|
| 4,653,090 | 3/1987 | Hayden | 379/204 |
| 4,785,408 | 11/1988 | Britton et al. | 379/97 X |
| 4,821,220 | 4/1989 | Duisberg | 364/578 |
| 4,885,717 | 12/1989 | Beck et al. | 364/900 |
| 4,891,630 | 1/1990 | Friedman et al. | 340/706 |
| 4,953,080 | 8/1990 | Dysart et al. | 364/200 |
| 5,041,992 | 8/1991 | Cunningham et al. | 364/518 |
| 5,050,090 | 9/1991 | Golub et al. | 364/478 |
| 5,060,276 | 10/1991 | Morris et al. | 382/8 |
| 5,075,848 | 12/1991 | Lai et al. | 395/425 |
| 5,093,914 | 3/1992 | Coplien et al. | 395/700 |
| 5,119,475 | 6/1992 | Smith et al. | 395/156 |
| 5,125,091 | 6/1992 | Staas, Jr. et al. | 395/650 |
| 5,133,075 | 7/1992 | Risch | 395/800 |
| 5,136,705 | 8/1992 | Stubbs et al. | 395/575 |
| 5,151,987 | 9/1992 | Abraham et al. | 395/375 |
| 5,181,162 | 1/1993 | Smith et al. | 364/419 |
| 5,241,588 | 8/1993 | Babson, III et al. | 379/94 X |
| 5,323,452 | 6/1994 | Dickman et al. | 379/207 X |

FOREIGN PATENT DOCUMENTS

| | | |
|---|---|---|
| 0463207 | 1/1992 | European Pat. Off. . |
| 3932686 | 4/1990 | Germany . |
| 4131380 | 3/1993 | Germany . |

OTHER PUBLICATIONS

Fredrik Ljungblom, "A Service Management Systems for The Intelligent Network", Ericsson Review No. 1, 1990, pp. 32–41.
Kathleen O. Rankin, "Boost '93: dishing out healthy portions of reality", Sep., 1993, Bellcore Exchange, pp. 21–24.

Primary Examiner—Jeffery A. Hofsass
Assistant Examiner—Harry S. Hong
Attorney, Agent, or Firm—Keith Stephens

[57] ABSTRACT

A method and system for enabling a set of object interface application elements and telephony system elements. Particular objects may be chosen depending on which elements of the telephony system will need to be interfaced. A particular object is capable of interfacing with one or more elements of the telephony system. The elements of the telephony system may be any identifiable aspect of the telephony system. For example, the objects could represent a handset or a line. Less tangible elements can also be represented, such as signals or procedures, including call progress tones, call setup, call hold, conference calls, or other call features.

24 Claims, 21 Drawing Sheets

OBJECT-ORIENTED TELEPHONY SYSTEM

COPYRIGHT NOTIFICATION

Portions of this patent application contain materials that are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to telephony systems and more particularly to a system for interfacing application elements with telephony elements.

2. Description of the Prior Art

Current telephony systems are fairly rudimentary, having changed very little from the basic principles of early telephony. Early systems often utilized switchboard operators for making connections between calling and called parties. By using computer technology, the need for such operators has been reduced to providing assistance in only special circumstances.

Other technological advances have turned telephony systems into an information transfer network or data highway. Facsimile is one of many examples which use the telephony system as an information transfer network. Perhaps the heaviest use of telephony systems comes from simple voice phone calls between calling and called parties. This interaction however, takes least advantage of telephony system capabilities.

Moreover, a typical user only has the most basic of equipment, which is designed for mere real-time voice transmission. The telephony system, however, is capable of transfering other infomation in addition to voice, and is also capable of providing a variety of information transfers which more fully utilize the available bandwidth and network capabilities of the telephony system.

The typical PBX is a classic example of a technology whose power has outstripped the available means of delivery. The average user makes use of only a tiny fraction of the full capability of most modern phone systems. The standard telephone handset is a human-interface bottleneck. At best, it is characterized by rows of buttons which must be labeled because there is no conventional mapping between position and function. Unfortunately, the labels give no clue as to the sequence in which the buttons must be pressed to accomplish a given operation. The presence of multi-function buttons (Transfer/3-Way Conference) adds further confusion to the picture.

While telephone companies have used computer technology to take advantage of, and to advance the potential of, the telephony system, the individual user has not been able to exploit the potential to the same extent. The closest an individual user comes to exploiting the potential of a telephony system is when a phone answering machine is used, and perhaps accessed remotely.

The telephone is really just a primitive terminal. A connection to another terminal is established by lifting the receiver to signal that network services are desired and then inputting a sequence of numbers which identify the terminal connection. The connection is terminated by hanging up. These simple operations provide convenience in creating a simple connection, but other aspects of the phone system require users to keep track of a variety of details.

For example, phone numbers are often memorized or kept manually in a handwritten notebook which must be carried around at all times. Address books, index cards, and massive lists printed on cheap paper and bound in unwieldy tomes are also frequently used. But storage is only part of the problem. Before they can be used, the numbers must be accessed—retrieved from memory, looked up in the card file or directory. And since numbers change over time, they must also be periodically updated. Storing numbers electronically in personal or on-line databases can mitigate the problems of retrieval and maintenance to some extent, but after it is located the number must still be manually transferred to the telephone set.

A telephone set also provides a less than ideal user interface in the case of operations which are more complex than establishing a simple one-to-one connection. In the case of a conference call, for example, the average user needs to check the reference manual to determine what sequence of keys to use: is it "*7" or "*8"? One alternative is to provide a special telephone set equipped with a row or two of extra buttons—the telephony equivalent of function keys on a computer keyboard, except that the labels on telephone buttons are typically a little longer: "TRNSF" for call transfer rather than "F6".

Therefore, there is a need to untap the potential of the present telephony system, especially the information transfer and network capabilities of the system.

SUMMARY OF THE INVENTION

It is an object of the present invention to provide improved access to telephony elements.

It is another object of the present invention to apply computer technology to telephony systems.

It is yet another object of the present invention to provide an interface between telephony system elements and application elements.

It is also an object of the present invention to make the boundary between the telephony world and generic sound world appear smooth and seamless.

The above objects are realized by providing elements which flexibly interface with various telephony system elements. These interface elements typically do not replace the telephony system elements, but rather provide a transparent way of interfacing with particular telephony system elements. The interfacing elements are designed to interface with particular elements of the telephony system, whether the telephony system elements of the telephony system are hardware elements, or merely protocols. For example, an interface element could provide a simple interface for receiving a call, and notifying an application element that a call is pending.

The interface elements provide a flexible and convenient way in which a programmer developing an application program involving telephony can utilize telephony system features without concerning themselves with the details of how the feature is accessed for a particular telephony system. The interface elements are also useful to hardware designers of telephony equipment.

Computer-based telephony has the potential to eliminate the limitations of the phone set while at the same time providing tight integration of telephone-based communications with applications running on the desktop. It is an essential part of the system foundation required to enable remote, real-time collaboration.

The present invention allows applications to access whatever internal telephone hardware is available on a target machine and provides generic dialing functionality via a modem or other external hardware device.

An object-oriented operating system is an essential element of computer-based telephony applications in a preferred embodiment.

Other objects and advantages of the present invention will become apparent from the following detailed description when viewed with the accompanying drawings.

DESCRIPTION OF THE PREFERRED EMBODIMENTS

Figure 1:
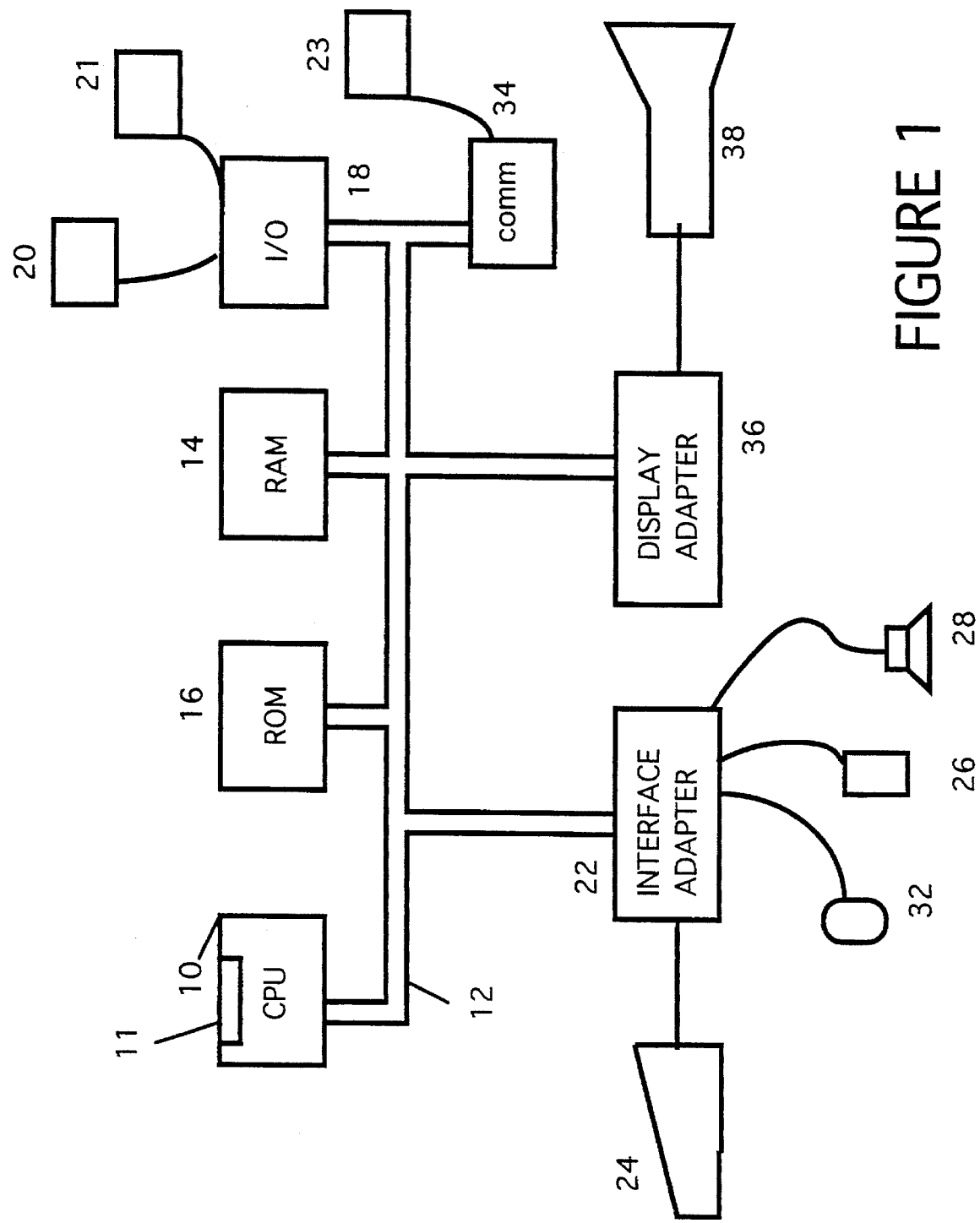
FIG. 1 shows a representative system in accordance with a preferred embodiment.

The detailed embodiments of the present invention are disclosed herein. it should be understood, however, that the disclosed embodiments are merely exemplary of the invention, which may be embodied in various forms. Therefore, the details disclosed herein are not to be interpreted as limiting, but merely as the basis for the claims and as a basis for teaching one skilled in the art how to make and/or use the invention.

As used herein, "telephony system" includes all aspects of telephonic communication.

Telephony Standards Networks

Historically, telephone networks standards have been established on a country-by-country basis. In many cases they have been subject to considerable variation, creating a localization nightmare, especially in Europe. Because of emerging digital standards such as ISDN (Integrated Services Digital Network) and the formation of the European Community in 1992, this situation will likely be ameliorated in the near future. In the United States, where incentives to move rapidly to ISDN are not as strong, we will very likely have to contend with two parallel networks, one analog and one digital, for some time to come.

In the analog domain, computer control of telephony functions is typically performed via a modem. (Note that the modem need not necessarily be a piece of external hardware. RISC and chip-based Digital Signal Processing technology make possible the implementation of fully functional internal software modems.) A widespread de facto standard for computer-to-modem communication is the so-called "AT" command set originally defined by Hayes, Inc.

In the digital domain the ISDN standard has been developed by a multinational working group of the CCITT (International Telegraph and Telephone Consultative Committee). The ISDN network layer protocols for setting up and tearing down connections are defined in CCITT Recommendation Q.931. (ISDN also includes specifications for physical and data link layers, as well as for a higher-level management entity.)

Switches

Between the telephone network and the telephone handset lies a switch of some sort which links a specific extension to the network. In the commercial market, this switch is most likely a PBX (Private Branch exchange). Aside from providing simple connections via the network, switches typically provide a variety of so-called supplementary services, such as holding, transferring, and conferencing. The protocols for accessing these services not only vary significantly, but have historically been proprietary to each switch manufacturer. While the ISDN network layer specification in Q.931 does address supplementary features, considerable latitude remains in the choice of features and in the actual sequence of messages used to implement a given feature.

Audio Data Formats

Depending on the type of network and on the interface between computer and telephone network, it may be possible to record audio data off the phone line for storage and playback on the computer. In the case of analog data, a pathway to Analog to Digital Conversion services would have to be provided, and the data could then be represented using whatever internal standards are valid for a given design center. In the case of digital data, the matter of external standards arises. CCITT has defined several data format standards compatible with the ISDN B-Channel transfer rate of 64,000 bits per second. There are 2 standards for uncompressed voice signals which take advantage of the full available bandwidth. Both of these are based on log-companded PCM (Pulse Code Modulation). In the first case, which is the primary format for North America, log-companding is provided by the It-Law function, in the second, which has been adopted primarily in Europe, the A-Law function is used. Each assumes an 8 KHz sample rate and allocates 8 bits per sample, providing an effective signal bandwidth of 3.5 KHz.

A number of standards for audio compression have been adopted by CCITT on the one hand and by the digital cellular industry on the other.

Object-Oriented Programming

In a preferred embodiment, the invention is implemented in the C++ programming language using object-oriented programming techniques. As will be understood by those skilled in the art, Object-Oriented Programming (OOP) objects are software entities comprising data structures and operations on the data. Together, these elements enable objects to model virtually any real-world entity in terms of its characteristics, represented by its data elements, and its behavior, represented by its data manipulation functions. In this way, objects can model concrete things like people and computers, and they can model abstract concepts like numbers or geometrical concepts. The benefits of object technology arise out of three basic principles: encapsulation, polymorphism and inheritance.

Objects hide, or encapsulate, the internal structure of their data and the algorithms by which their functions work. Instead of exposing these implementation details, objects present interfaces that represent their abstractions cleanly with no extraneous information. Polymorphism takes encapsulation a step further. The idea is many shapes, one interface. A software component can make a request of another component without knowing exactly what that component is. The component that receives the request interprets it and figures out according to its variables and data, how to execute the request. The third principle is inheritance, which allows developers to reuse pre-existing design and code. This capability allows developers to avoid creating software from scratch. Rather, through inheritance, developers derive subclasses that inherit behaviors, which the developer then customizes to meet their particular needs.

A prior art approach is to layer objects and class libraries in a procedural environment. Many application frameworks on the market take this design approach. In this design, there are one or more object layers on top of a monolithic operating system. While this approach utilizes all the principles of encapsulation, polymorphism, and inheritance in the object layer, and is a substantial improvement over procedural programming techniques, there are limitations to this approach. These difficulties arise from the fact that while it is easy for a developer to reuse their own objects, it is difficult to use objects from other systems and the developer still needs to reach into the lower non-object layers with procedural Operating System (OS) calls.

Another aspect of object-oriented programming is a framework approach to application development. One of the most rational definitions of frameworks come from Ralph E. Johnson of the University of Illinois and Vincent F. Russo of Purdue. In their 1991 paper, *Reusing Object-Oriented Designs,* University of Illinois tech report UIUCDCS91-1696 they offer the following definition: "An abstract class is a design of a set of objects that collaborate to carry out a set of responsibilities. Thus, a framework is a set of object classes that collaborate to execute defined sets of computing responsibilities." From a programming standpoint, frameworks are essentially groups of interconnected object classes that provide a pre-fabricated structure of a working application. For example, a user interface framework might provide the support and "default" behavior of drawing windows, scrollbars, menus, etc. Since frameworks are based on object technology, this behavior can be inherited and overridden to allow developers to extend the framework and create customized solutions in a particular area of expertise. This is a major advantage over traditional programming since the programmer is not changing the original code, but rather extending the software. In addition, developers are not blindly working through layers of code because the framework provides architectural guidance and modeling but at the same time frees them to then supply the specific actions unique to the problem domain.

From a business perspective, frameworks can be viewed as a way to encapsulate or embody expertise in a particular knowledge area. Corporate development organizations, Independent Software Vendors (ISV)s and systems integrators have acquired expertise in particular areas, such as manufacturing, accounting, or currency transactions as in our example earlier. This expertise is embodied in their code. Frameworks allow organizations to capture and package the common characteristics of that expertise by embodying it in the organization's code. First, this allows developers to create or extend an application that utilizes the expertise, thus the problem gets solved once and the business rules and design are enforced and used consistently. Also, frameworks and the embodied expertise behind the frameworks have a strategic asset implication for those organizations who have acquired expertise in vertical markets such as manufacturing, accounting, or bio-technology would have a distribution mechanism for packaging, reselling, and deploying their expertise, and furthering the progress and dissemination of technology.

Historically, frameworks have only recently emerged as a mainstream concept on personal computing platforms. This migration has been assisted by the availability of object-oriented languages, such as C++. Traditionally, C++ was found mostly on UNIX systems and researcher's workstations, rather than on Personal Computers in commercial settings. It is languages such as C++ and other object-oriented languages, such as Smalltalk and others, that enabled a number of university and research projects to produce the precursors to today's commercial frameworks and class libraries. Some examples of these are InterViews from Stanford University, the Andrew toolkit from Carnegie-Mellon University and University of Zurich's ET++ framework.

There are many kinds of frameworks depending on what level of the system you are concerned with and what kind of problem you are trying to solve. The types of frameworks range from application frameworks that assist in developing the user interface, to lower level frameworks that provide basic system software services such as communications, printing, file systems support, graphics, etc. Commercial examples of application frameworks are MacApp (Apple), Bedrock (Symantec), OWL (Borland), NeXTStep App Kit (NEXT), and Smalltalk-80 MVC (ParcPlace) to name a few.

Programming with frameworks requires a new way of thinking for developers accustomed to other kinds of systems. In fact, it is not like "programming" at all in the traditional sense. In old-style operating systems such as DOS or UNIX, the developer's own program provides all of the structure. The operating system provides services through system calls—the developer's program makes the calls when it needs the service and control returns when the service has been provided. The program structure is based on the flow-of-control, which is embodied in the code the developer writes.

When frameworks are used, this is reversed. The developer is no longer responsible for the flow-of-control. The developer must forego the tendency to understand programming tasks in term of flow of execution. Rather, the thinking must be in terms of the responsibilities of the objects, which must rely on the framework to determine when the tasks should execute. Routines written by the developer are activated by code the developer did not write and that the developer never even sees. This flip-flop in control flow can be a significant psychological barrier for developers experienced only in procedural programming. Once this is understood, however, framework programming requires much less work than other types of programming.

The invention is preferably practiced in the context of an operating system resident on a personal computer such as the IBM® PS/2 ® or Apple® Macintosh® computer. A representative hardware environment is depicted in FIG. 1, which illustrates a typical hardware configuration of a computer in accordance with the subject invention having a central processing unit 100, such as a conventional microprocessor, and a number of other units interconnected via a system bus 132. The computer shown in FIG.1 includes a Read Only Memory (ROM) 104, a Random Access Memory (RAM) 106, an I/O adapter 112 for connecting peripheral devices such as disk units 108 and other I/O peripherals represented by 110 to the system bus 132, a user interface adapter 128 for connecting a keyboard 130, a mouse 126, a speaker 122, a microphone 124, and/or other user interface devices such as a touch screen device (not shown) to the bus, a communication adapter 116 for connecting the workstation to a data processing network represented by 114. A display adapter 120 for connecting the bus to a display device 118. The workstation has resident thereon an operating system such as the Apple System/7 ® operating system.

Computer-Based Telephony Applications

Voice-oriented applications of computer-based telephony fall into 3 categories depending on their basic requirements:

1) Applications which rely on software control of telephony features without provisions for capturing or accessing the voice signal;
2) Applications which do need to record and play back voice data; and
3) Applications which assume simultaneous transmission of voice and non-voice data.

Over the years, a variety of devices have been devised to make the telephone more useful. Many of these involve computer-controlled telephony.

Virtual Telephone Set

Applications of this genre directly address the issue of the advanced telephone system which is so complex that it is used to its full potential by less than 10% of its users. The basic problem with such systems has to do with the fact that the average telephone handset is a device with a very low interface bandwidth. Each new feature added to the phone systems results in another button on the handset (or—shades of MS-DOS—another special sequence of numbers to memorize: "*3" to transfer, "*5" to forward).

Software control of such functions from the desktop, combined with a well-designed graphical user interface, will help end-users to bypass the arcane idiosyncrasies of their local PBX and enable them to start benefiting from the technological improvements that telephone equipment manufacturers have managed to achieve since the days of Alexander Graham Bell. A good example of this concept is Northern Telecom's Meridian TeleCenter, which runs on current Macintoshes, but of course operates only with Northern Telecom's own PBX's.

Telemarketing

In it's simplest form, computer-controlled telemarketing tools simply permit automatic dialing from a database of telephone numbers. More sophisticated variants dial out on multiple lines and detect when a human being has answered on the other end of the connection, or present detailed customer information on the screen for each dialed party.

Voice I/O

Desktop Answering Machine

The idea here is to place Voice Mail on the desktop in order to bring it up to the level of functionality we have come to expect from text mail systems. The typical Voice Mail system today is a centralized service which is parallel to and completely isolated from all other forms of electronic communication.

Even when they are available, such features as group addressing and on-line directories are difficult to use via a standard push-button phone set and must be set up and maintained separately from electronic mail databases even though they contain duplicate information. Calling in to check one's voice mailbox is just one more unnecessary detour in the flow of information through office and home. The Voice Mail systems of this decade are analogous to the centralized computer systems of the Seventies.

Some of the improvements to existing telephone services which are just now becoming widely available will be greatly enhanced by the migration of voice messaging to the desktop. For example, the ability for the receiving party to examine the phone number from which an incoming call was placed (so-called Calling Party Identification) will, among other things, permit the user to set up personalized greeting messages. For example, if I am expecting an important call from my brother, John, and I know I may not be in when he calls, I can record a message to be played when my computer answers any call originating from one of the phone numbers listed for him in my electronic address book.

The presence of a computer on the receiving end of a call also increases the potential for manipulating messages once they have been recorded. Any editing of audio data is obviously out of the question if one's only terminal is a push-button handset. With the increasing use of digital formats for transmission of voice data (as with ISDN) it is extremely wasteful not to provide a means for capturing the audio signal as it streams by.

Remote Access

To access your office computer system from home, all you need is a phone line, a modem and another computer. So what if you're at the airport and you realize you forgot to bring the address of the customer site you are going to visit? What if you arrive at your destination to find that the airline has lost your modem along with the rest of your luggage? What if you can't afford to buy a second computer? Then you need the ability to dial up your office system from a standard phone and access the information stored on your hard disk by asking the computer to read it to you. You'll also need Text-to-Speech Synthesis software on your office machine and a way to control the desktop using DTMF (dual-tone multi-frequency) keys or voice commands (i.e. Automatic Speech Recognition).

Interactive Voice Response

This term covers a broad range of applications which permit remote callers to listen to selections from a collection of prerecorded messages. These applications may be solely dedicated to information delivery (e.g. the IRS's Teletax service), or they may combine informational interactions with transaction processing (e.g. an order-entry service for a mail-order catalog or a bank-by-phone service which permits depositors to check account balances, transfer funds, and make loan payments).

Traditionally, putting together even a straightforward information delivery system has required a specialized team of programmers and systems integrators. At least one third party providing such services has developed a graphically-oriented tool on the Macintosh for generating a set of control files which are then uploaded to a stand-alone Voice Response system Voice Bulletin Board Service This is a voice-mediated version of the familiar electronic BBS. It is actually a hybrid of Voice Mail and Interactive Voice Response. Callers browse through various categories of voice messages left by other callers, then record their own messages in response.

Simultaneous Voice and Data

Collaboration

The role that telephony services play in collaboration depends, of course, on the kind of collaboration we are talking about. Plain vanilla Voice Mail might be involved in sequential, asynchronous collaboration (e.g. reviewer receives copy of document, reads it privately, and responds with a voice message). Simultaneous, asynchronous collaboration involves placing a call to an author of a document (automatically extracting the phone number from a "business card" object attached to the document) so that a reviewer can deliver comments in person while the author is displaying a separate copy of the document. A third type of collaboration is simultaneous, real-time collaboration a l`a CHER, in which a document is simultaneously updated by author(s) and reviewer(s). The degree to which collaboration of this last type enhances the interaction of team members will no doubt vary in inverse proportion with their physical proximity to one another. It is in the case of remote collaboration among geographically dispersed work-groups that telephony comes into play. The basic idea would to maintain a standard voice connection while simultaneously transmitting and receiving document updates over a data connection. Such an interaction could be carried out over two standard phone lines or over a single ISDN connection.

Cheap Video Phone

Another intriguing application of simultaneous voice and data transmission involves the use of an inexpensive video camera along with a video digitizer card to transform a standard ISDN connection into a poor man's video phone. In other words, a voice connection can be enhanced by the periodic bi-directional transmission of captured video frames showing the callers' faces and/or objects held up to the video camera. Even when the frame-rate is extremely low, the end result can be quite interesting.

The present invention has been designed to empower application writers to blaze new trails in all three areas.

Telephony Objects

The present invention is designed to enable the development of computer-based telephony applications, and allow telephony designers to exploit these newly developed applications. The telephone is in essence a primitive terminal used to establish a connection to another terminal by lifting the receiver to signal that network services are desired. A sequence of numbers identifying the terminal you wish to connect with is then input. The connection is broken by hanging up. The present invention supports computer-based telephony by providing a high-level interface to voice-oriented telephone functions. These functions include the "lowest common denominator" of the capabilities in typical telephony configurations. The invention is intended to insulate application-level code from differences in the equipment through which these functions are accessed. At the same time, the invention provides a flexible framework which can be easily extended to include new features or to accommodate the peculiarities of various combinations of telephone sets, local hardware and software platforms, network types, and switch signaling protocols.

When such a flexible framework for interfacing is provided, numerous application program writers will develop software for exploiting the usefulness of such an interface. In turn, telephony system designers will desire to exploit the new application elements, and will therefore also need interface elements to work with. Therefore, two types of objects will be useful to discuss: objects for application writers on the one hand, and objects for developers of extensions to the basic interface on the other. In general, objects of interest to application developers will also be of interest to telephony system developers. Each category will be discussed below. It should be kept in mind, however, that the headings below are for purposes of discussion only, and are not considered to be limiting in any way.

I. Objects for application developers

A telephony system is comprised of many elements which would be useful to interface with. In general, there are two categories of these elements. The first category involves the physical equipment which is used tin implementing a telephony system, while the second involves the transactions which are processed by the telephony system. Objects for each category will be discussed, and examples will be provided outlining possible types of interfacing elements.

A. Objects for hardware-type elements

From the point of view of the application writer, the present invention facilitates the implementation of simple and intuitive user interfaces for computer-based telephony applications. Hardware-independence of the objects will allow an application to run regardless of the phone system attached to the computer or the telephony features currently available to the end-user. A standard protocol allows an application to determine at launch time which of the features it "knows about" are active and which are inactive.

Figure 2:
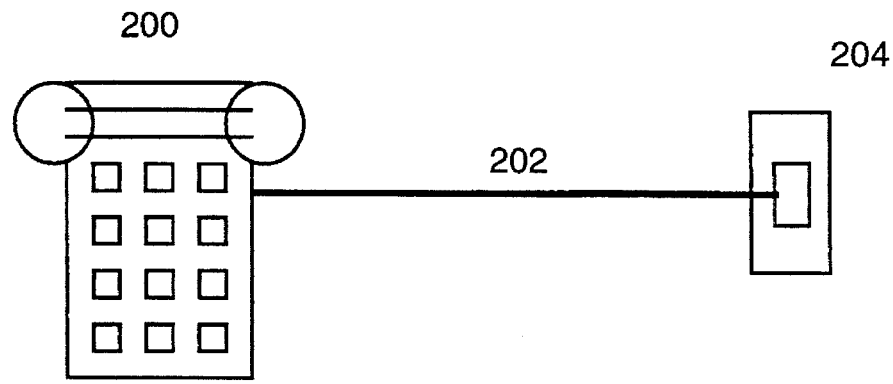
FIG. 2 shows a typical hookup of a handset to a wall jack in accordance with a preferred embodiment.

FIG. 2 shows the real-world telephony object most familiar to the end user: the single-line telephone handset 200 which plugs into a wall jack 204 to connect to a telephone line 202. The fact that there is an enormous "netscape" of wire, fiber, switches and central offices behind the wall jack does not enter into the consciousness of the average user. What is important is that a specific line 202 is now accessible via a specific handset 200. The correspondence between handsets and lines, however, need not be one-to-one.

Figure 3:
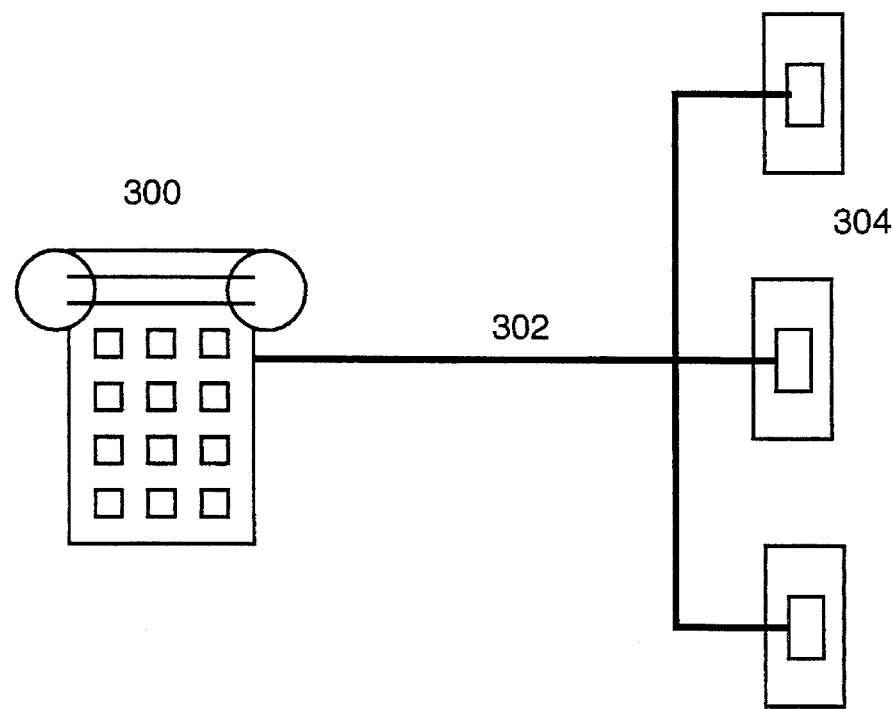
FIG. 3 shows a handset hooked up to multiple lines and multiple jacks in accordance with a preferred embodiment.

A single phone line may be split into several extensions, each with its own handset (not shown) or, as illustrated by FIG. 3, a single handset 300 may provide sequential access to several lines 302, each connected to separate jacks 304. The former case is typical of residential installations. The multiline handset, on the other hand, might be used by a small business or by an administrative assistant supporting 3 executives. Typically, the end-user selects a line by pushing a labeled button somewhere on the handset 300.

FIGS. 2 and 3 are not labeled as prior art because handset 200 could be implemented to include the features of the present invention.

Figure 4:
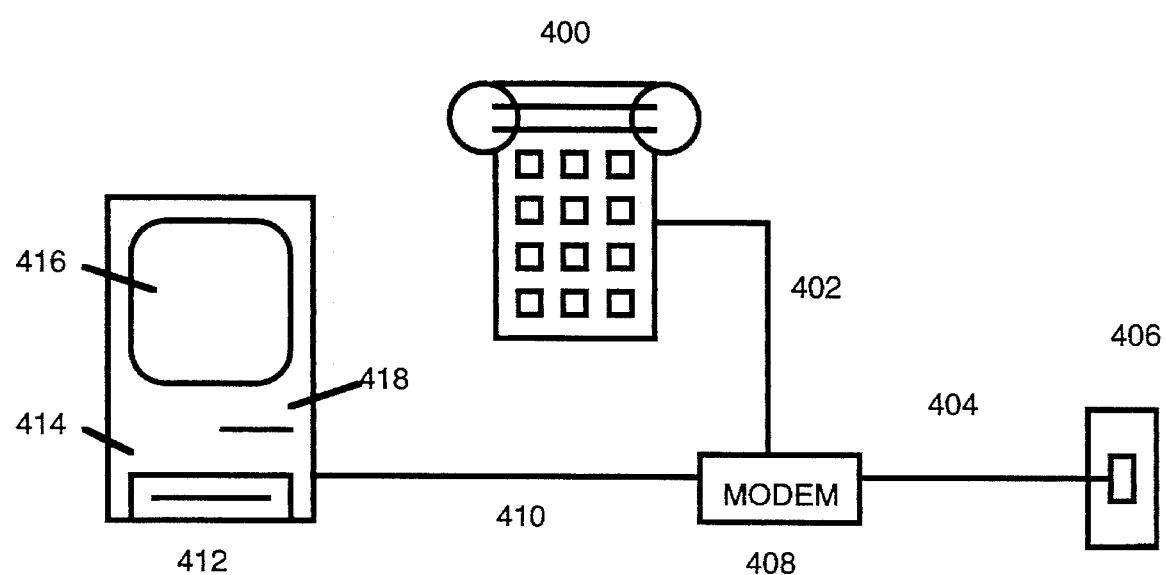
FIG. 4 shows a computer-based telephony system utilizing a modem in accordance with a preferred embodiment.

FIG. 4 represents a possible system for implementing computer-based telephony in accordance with the present invention. In the actual equipment configuration required for computer-based telephony, the telephone line 404 connects not to the handset 400 but to a computer 412 via the medium of an external device, such as a modem 408. Line 410 connects the computer 412 to modem 408, and line 404 connects modem 408 to jack 406. The handset 400, which is not even necessary for many applications, also connects to the external device 408 or telephone interface, and can usually be used to initiate or terminate connections independently of the computer 412. The computer may or may not be able to control and/or query the handset.

The computer 412 may be similar to that shown in FIG. 1, comprising a personal computer or even a workstation. Computer 412 may include a keyboard 414, display 416, and floppy drive 418.

Figure 5:
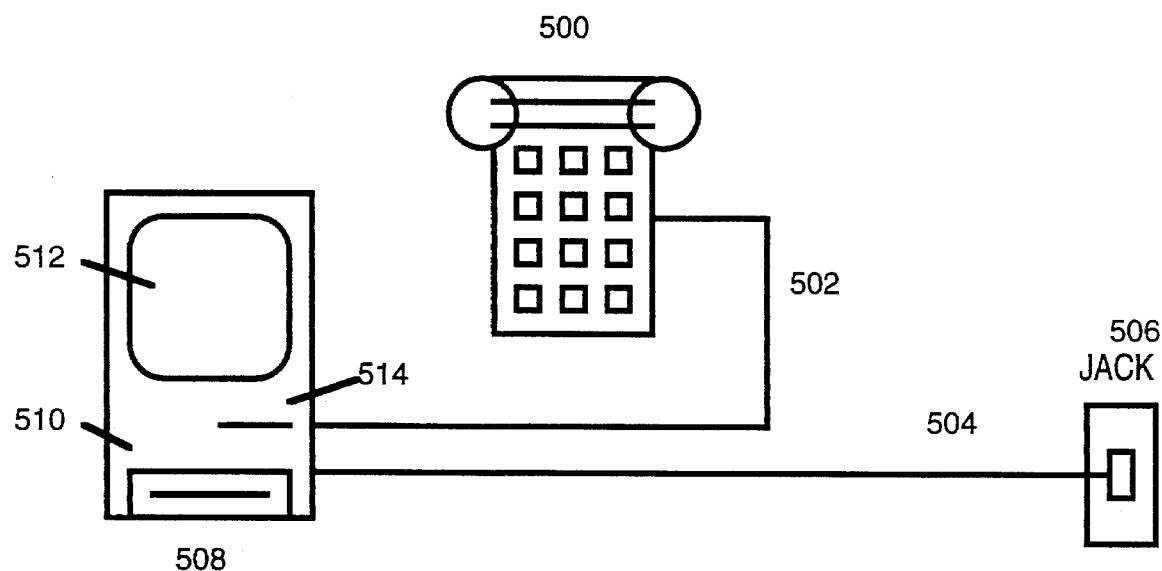
FIG. 5 shows a computer-based telephony system having a computer interposed between the handset and jack in accordance with a preferred embodiment.

FIG. 5 demonstrates a variation of the system of FIG. 4, showing a computer 508 which has a telephone interface for connecting handset 500 to jack 506 via lines 502 and 504, which can be built-in or card based. Computer 508, like that shown in FIG. 4, includes a keyboard 512, display 512, and floppy drive 514. Computer 508 is capable of responding to both handset 500 and signals coming over the telephone lines via line 502. Computer 508 is also capable of passing signals between handset 400 and jack 506 without modification.

Figure 6:
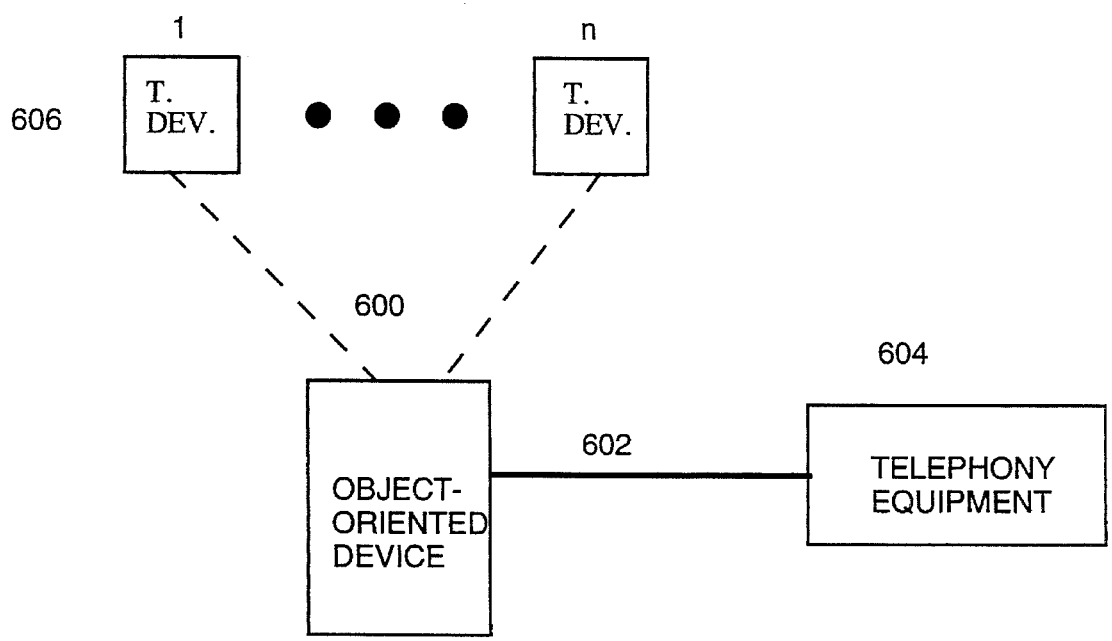
FIG. 6 shows hardware in accordance with a preferred embodiment.

The above discussion outlines some specific hardware which could be used to implement the present invention. It should be kept in mind, however, that such hardware is merely illustrative, and that the present invention could be implemented on a variety of systems and devices connected to the telephone network. FIG. 6 demonstrates a device embodying at least some of the principles of the present invention. Device 600 utilizes objects for interfacing with various elements of the telephony system 604 to which it is connected via line 602. Device 600 may or may not be connected to one or more devices 606.

It should also be noted that device 600 may advantageously be connected at points in the system other than to a jack. That is, the object-oriented device may be connected out in the network, interfacing with elements of the telephony system.

The system the present invention is implemented on should be capable of multitasking or multiprocessing. This would provide optimum performance of applications and use of system resources via the objects.

ARCHITECTURAL OVERVIEW

The applications running on the devices connected to the telephone system utilize specially designed interface elements to interact with the elements of the telephony system. It should be noted that the terminology "applications running" is meant to include not only software programs which are running on a computer, but also hardware which may be performing particular applications. These interface elements standardize the methods used for passing information from and to various of the telephony system elements. The interface elements are advantageously implemented using objects in a preferred embodiment.

Telephone Line Handle

Figure 7:
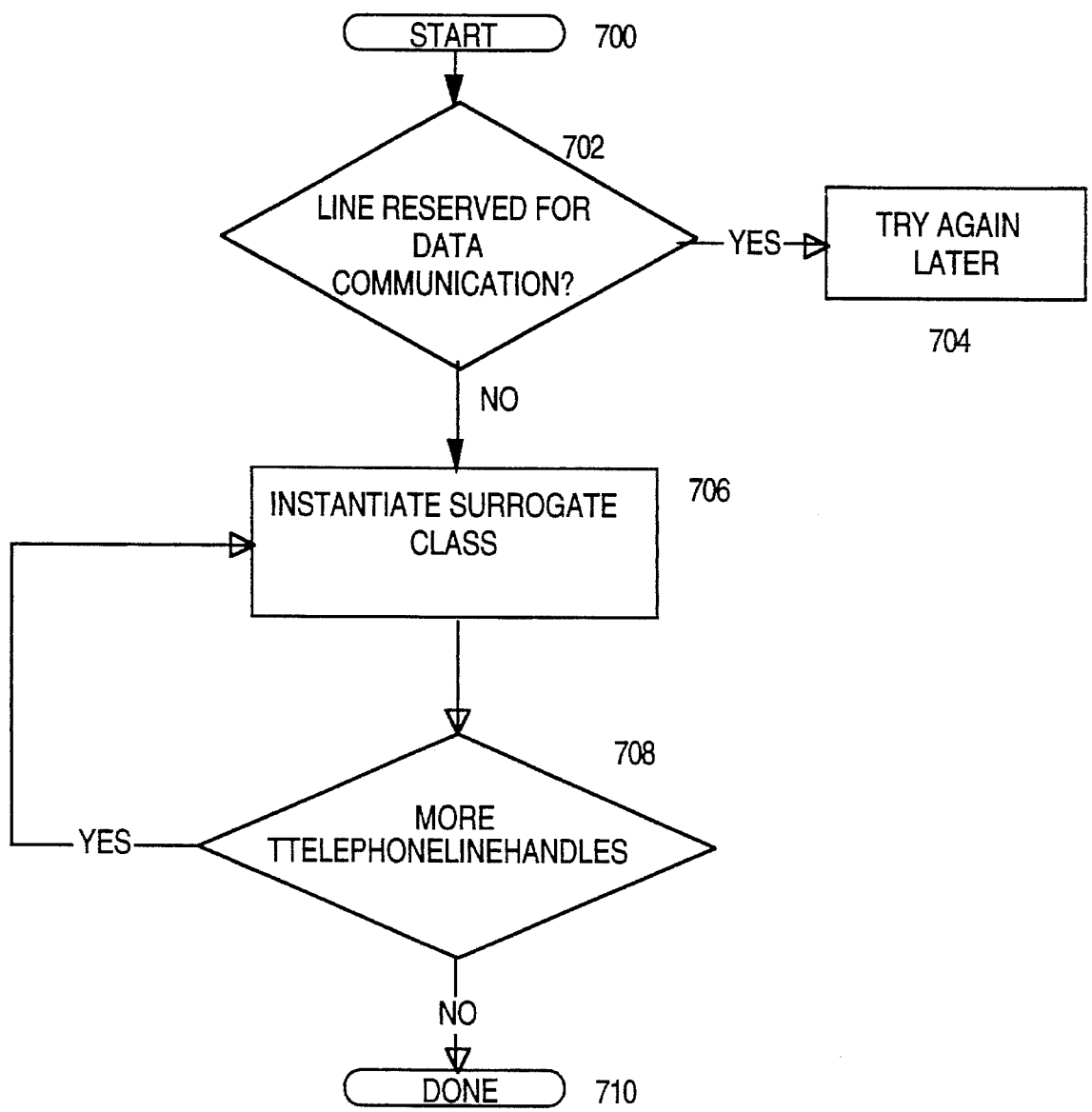
FIG. 7 shows the instantiation of a TTelephoneLineHandle object in accordance with a preferred embodiment.

FIG. 7 is a flow chart, beginning at step 700, demonstrating the instantiation of multiple TTelephoneLineHandles. As shown by steps 702 and 704, the present invention views the telephone line as a system resource which can be shared among voice-oriented applications, as long as it has not been previously reserved for data communications. Such applications actually access telephony services through the surrogate class TTelephoneLineHandle (step 706). In order to permit the user to maintain operation of an answering machine application, for example, in the background while launching repeated instances of, say, an auto-dial application in the foreground, multiple TTelephoneLineHandles may be instantiated for the same line and distributed across team boundaries (steps 706 and 708). The process of instantiation ends at step 710 when no further TTelephoneLineHandles are necessary, but may be repeated each time an instance of TTelephoneLineHandle is needed.

Figure 8:
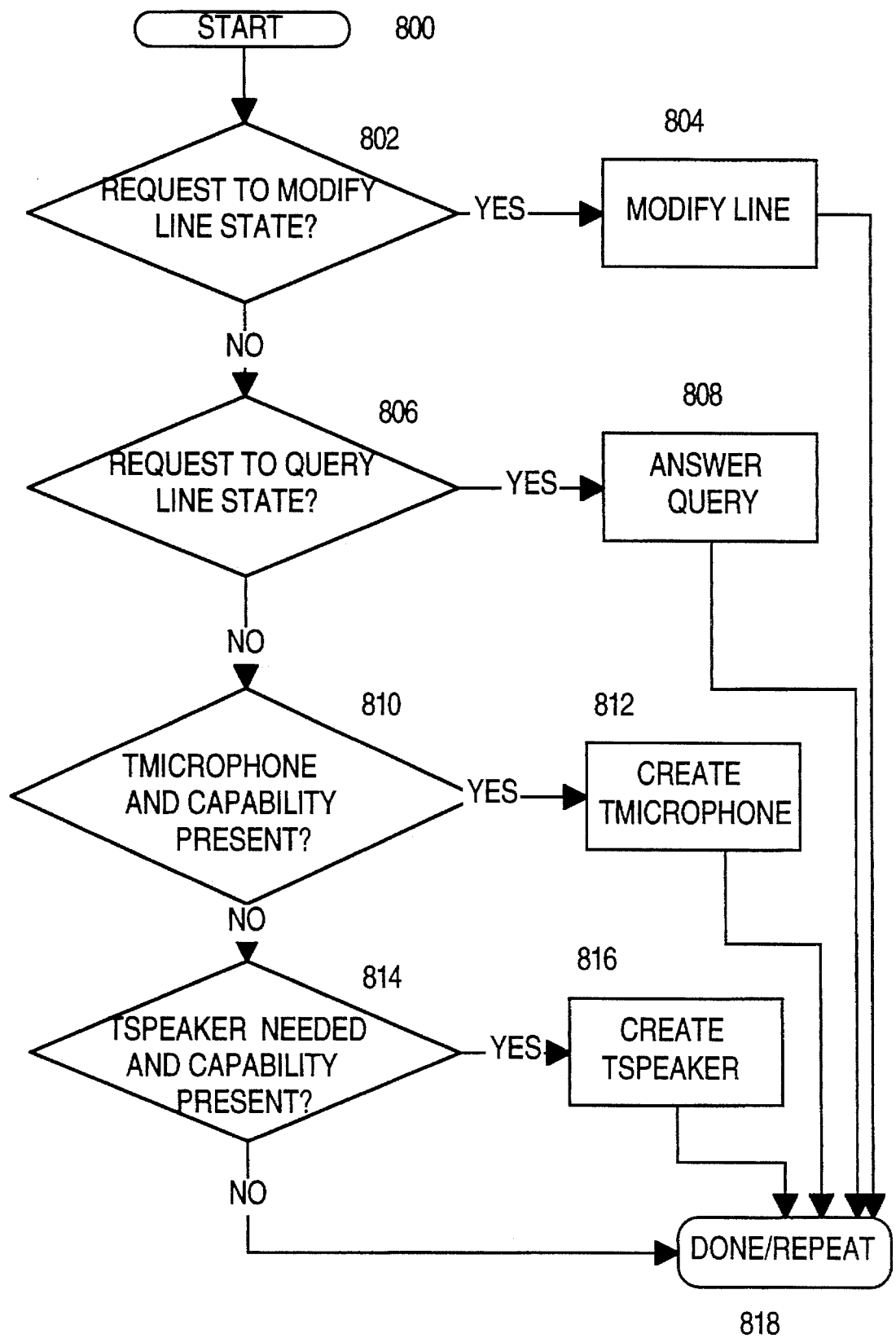
FIG. 8 shows the functional characteristics of TTelephoneLineHandle. in accordance with a preferred embodiment.

FIG. 8 shows a possible flow of operations characteristic of the functions carried out by TTelephoneLineHandle. In addition to permitting the state of the telephone line to be modified (steps 802 and 804) and queried (steps 806 and 808), TTelephoneLineHandle provides member functions for creating a standard TMicrophone (steps 810 and 812) or TSpeaker (steps 814 and 816) object representing the line's audio input or output capability, if any. The functional flow of TTelephoneLineHandle is delineated by steps 800 and 818.

Note that from the point of view of the voice application, it is immaterial whether the "real" telephone line is connected to the computer via the physical modem device illustrated in FIG. 4, or via some type of internal interface, as in FIG. 4. All the application "sees" under either configuration is a TTelephoneLineHandle.

Telephone Handset Handle

TTelephoneHandsetHandle represents the physical telephone device as opposed to the telephone line. The standard TTelephoneHandsetHandle class has member functions for reporting its hookswitch state and for creating a standard TMicrophone or TSpeaker object representing the handset's audio input or output capability, if any. If such capability is present, the handset will typically operate in two modes, one in which audio is routed directly to and from the physical telephone line, bypassing the computer altogether, and a second in which audio is routed to and from the computer, leaving the physical line out of the loop. Before a handset can be used as a local speaker or microphone, however, it must be explicitly "disconnected" from the physical line. Note that the speaker and microphone created by a TTelephoneHandsetHandle are completely independent of those created by a TTelephoneLineHandle. Playing audio data to the handset's speaker causes sound to come out of the handset. Playing data to the line's speaker causes sound to be sent over the telephone network.

Subclasses may include physical handsets with buttons, displays, or external speakers and microphones with associated gain controls. There is, of course, a "lower" common denominator: a telephone device whose switch status cannot be monitored. In this case, a TTetephoneHandsetHandle object would not be terribly useful. Even when switch status is available, the standard version of TTelephoneHandsetHandle is completely optional for the typical computer-based telephony application.

B. Objects for telephony transactions

In addition to the hardware-type entities associated with use of the telephone network (described above), there are less tangible objects. For example, the connection itself, or, as an end user might think of it, the telephone call could be considered an intangible. A call has an existence and state independent of the telephone line. To make a call a user must first "find" a telephone line. ("Where can I find a telephone? I need to make a call.") To receive a call, a user needs to know which line it is coming in on. ("Mr. Smith, you have a call on line 1.") A line is either on-hook or off-hook, while a call passes through a variety of states during its lifetime. In many cases, a single line can support multiple simultaneous calls where the user has placed one call on hold in order to place a second, outgoing call. Alternatively, a user may add a call to an existing connection to produce a three-way conference call.

In the real world, information about the progress of a call is communicated back to the user via the audio channel: a continuous tone indicates that the call can be dialed, an interrupted tone indicates that the destination line is busy, a "ringing" tone indicates that the destination phone is ringing, etc. In computer-based telephony interfaces these same signals may be obtained, as well as subtler details about a call's state, in the form of alphanumeric status indications.

Telephone Call Handle

Figure 9:
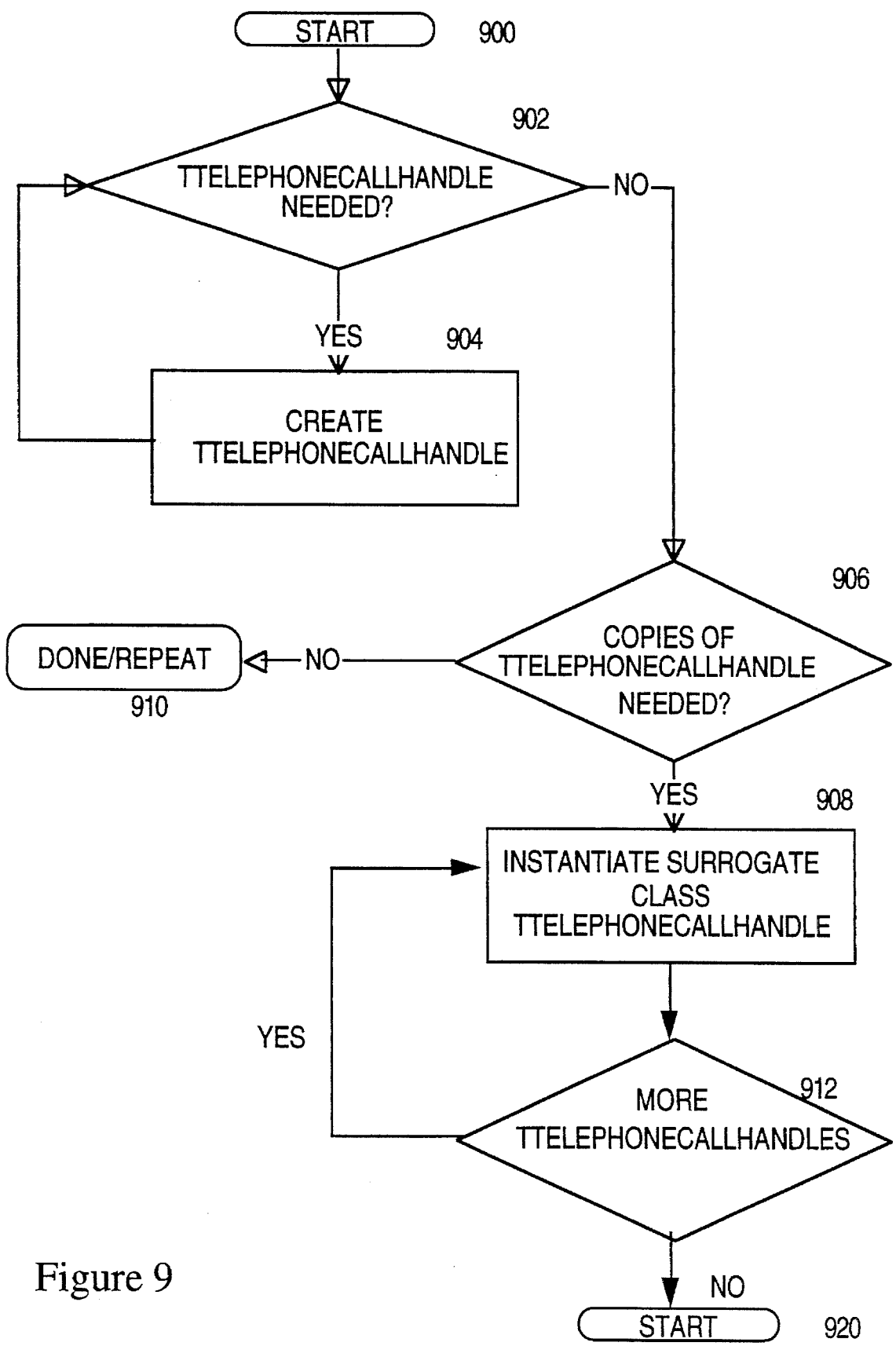
FIG. 9 shows the instantiation of TTelephoneCallHandle in accordance with a preferred embodiment.

As shown in FIG. 9, between steps 900 and 910, applications initiate and terminate telephone connections by asking (step 902) an instance of TTelephoneLineHandle to create a TTelephoneCallHandle (step 904).

Figure 10:
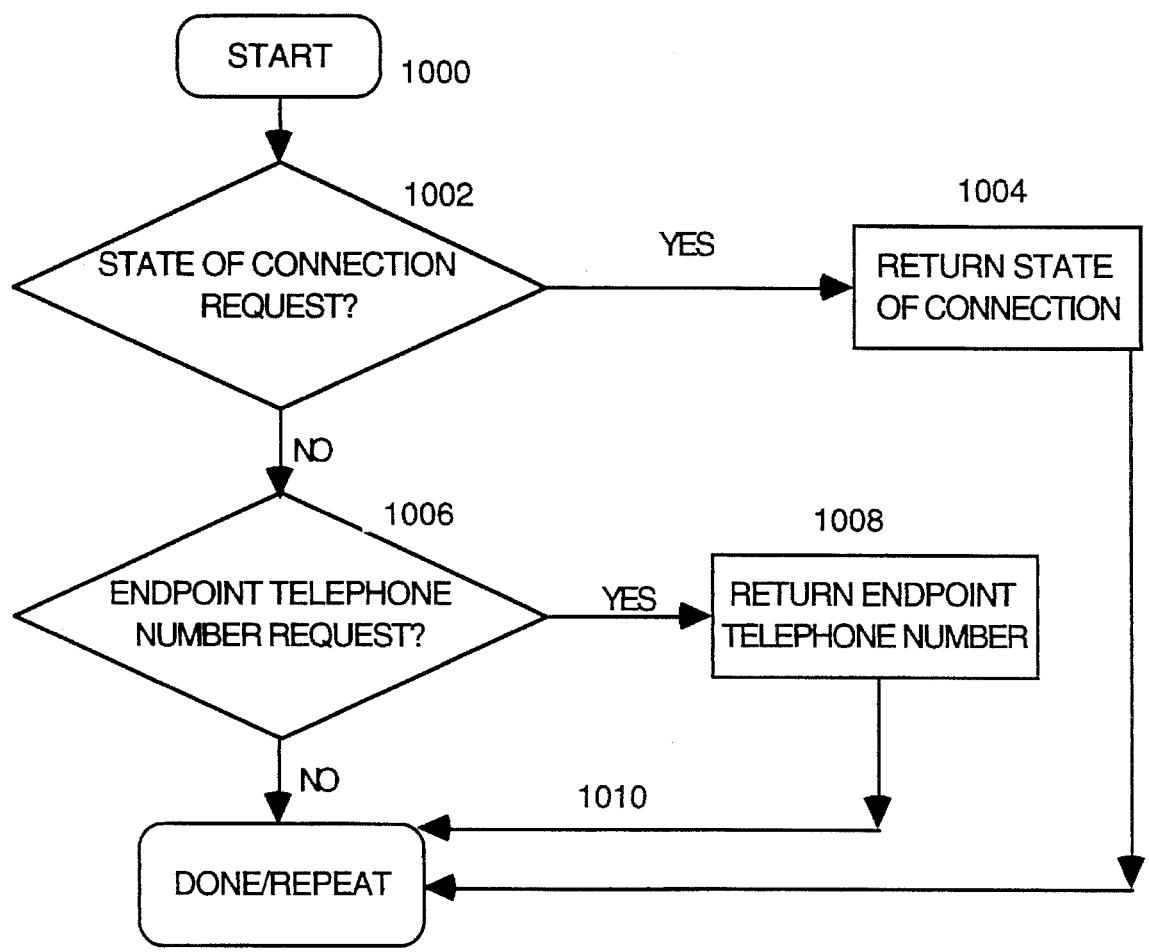
FIG. 10 shows the functional characteristics of TTelephoneCatlHandle in accordance with a preferred embodiment.

FIG. 10 shows a functional flow for TTelephoneCallHandle. As shown between steps 1000 and 1010, TTelephoneCallHandle provides access methods for determining the state of the connection (steps 1002 and 1004) as well as for returning the telephone number of the remote endpoint (step 1006 and 1008).

Telephone Feature Control

Since TTelephoneLineHandle only permits calls to be placed, answered, and hung up, a family of classes has been provided to facilitate access to the more popular supplementary voice features. In addition to creating calls, a Line Handle can create individual feature control objects for whatever set of advanced features happens to be available. Examples of such features may include the following feature set: Hold, Transfer, Conference, Drop, and Forward. Note that the availability of features depends not only on what the telephony hardware platform is potentially capable of providing, but also on which features the user has actually subscribed for.

Telephone Notification

Figure 11:
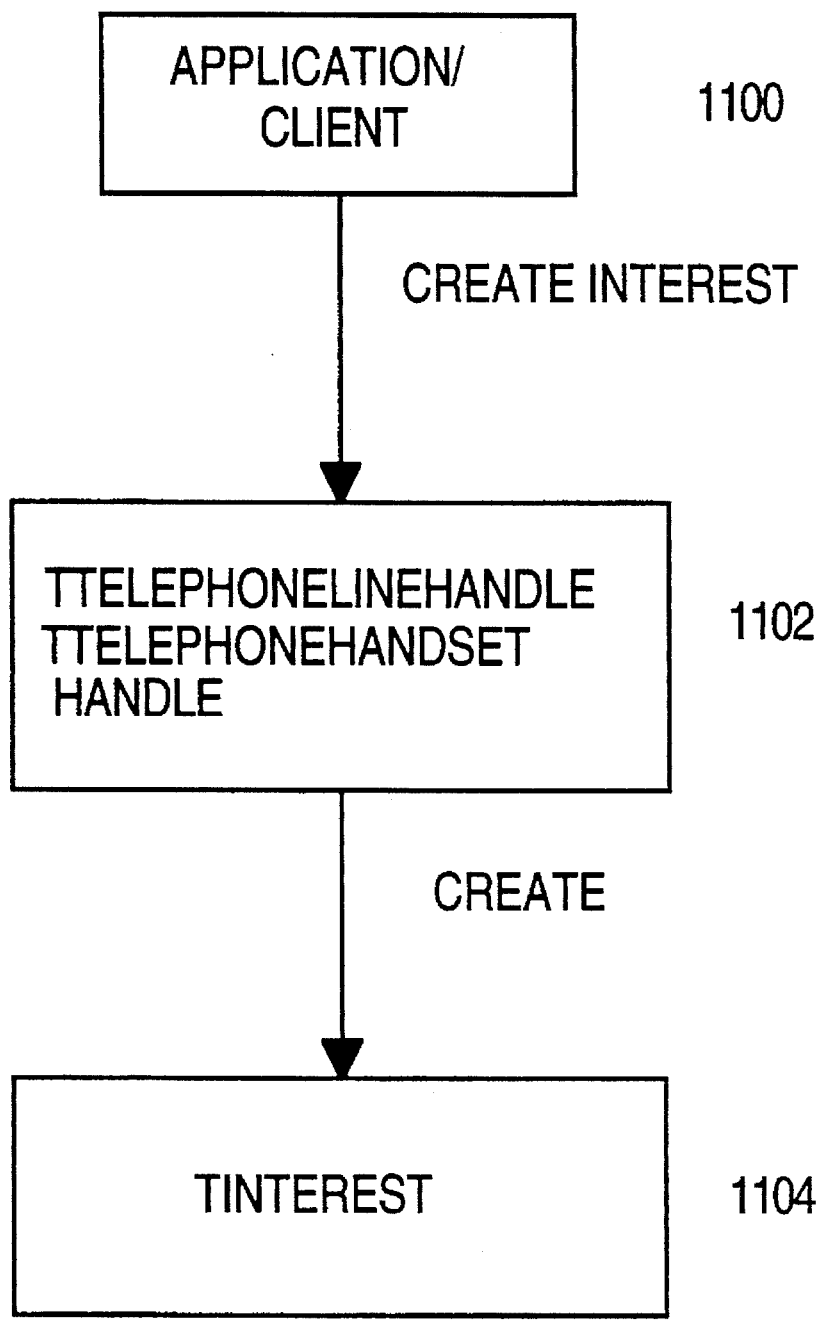
FIG. 11 shows an application creating an interest in accordance with a preferred embodiment.

FIG. 11 is a flow diagram illustrating how an application 1100 sets up to receive certain notifications regarding telephone systems. Clients 1100 wishing to receive any of the notifications discussed below must register interest in them using the standard Notification framework. TInterests 1104 for telephony notifications must be created by calling one of the "create interest" member functions provided by TTelephoneLineHandle and TTelephoneHandsetHandle 1102.

Figure 12:
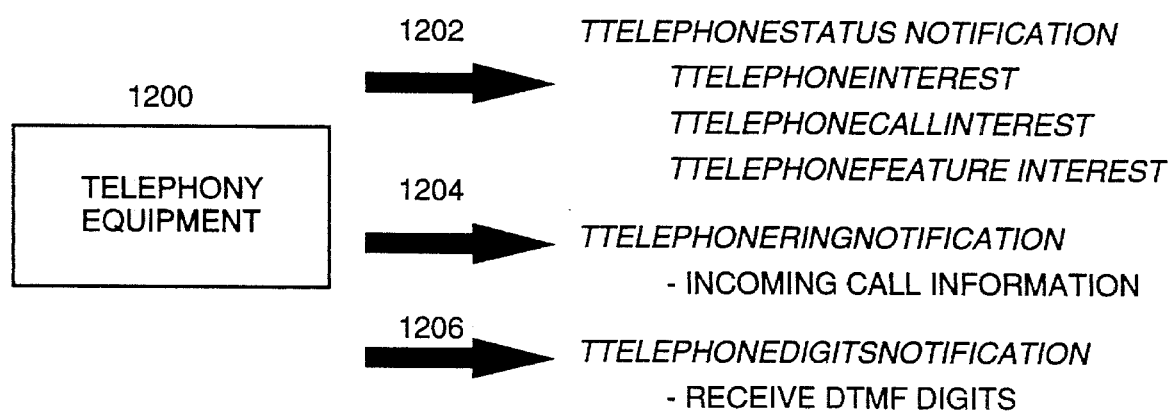
FIG. 12 shows a telephony system sending information in accordance with a preferred embodiment.

FIG. 12 illustrates telephony equipment 1200 sending out information via objects which can be used to manage telephony transactions. Information regarding the state of lines, calls, and features is propagated outward from the underlying telephony hardware by means of three telephony-oriented subclasses of TNotification. TTelephoneStatusNotification transports at 1202 an instance of one of three telephony-specific subclasses of TInterest: TTelephoneInterest, TTelephoneCallInterest or TTelephoneFeatureInterest. Status updates themselves are represented by TToken constants. TTelephoneRingNotification propagates information at 1204 about incoming calls. TTelephoneDigitsNotification at 1206 permits clients to receive DTMF digits generated by the remote endpoint.

Phone Numbers

TPhoneNumber, TPhoneEndpoint, and the other classes can be used to represent telephone numbers.

Audio Objects

The TSpeaker and TMicrophone objects returned by TTelephoneLineHandle and TTelephonehandset are subclasses of the speaker and microphone classes. One caveat: data format standards for digital telephony may differ from location to location. Voice data coming in from an ISDN line, for example, will be log-companded rather than linear and digitized at 8 KHz rather than 22 KHz. To address this potential incompatibility, the present invention contemplates format conversion classes. For example, format conversion classes may include: T8KMuLawTo22KConverter, T8KALawTo22KConverter, T22KTo8KMuLawConverter, and T22KTo8KALawConverter.

Figure 13:
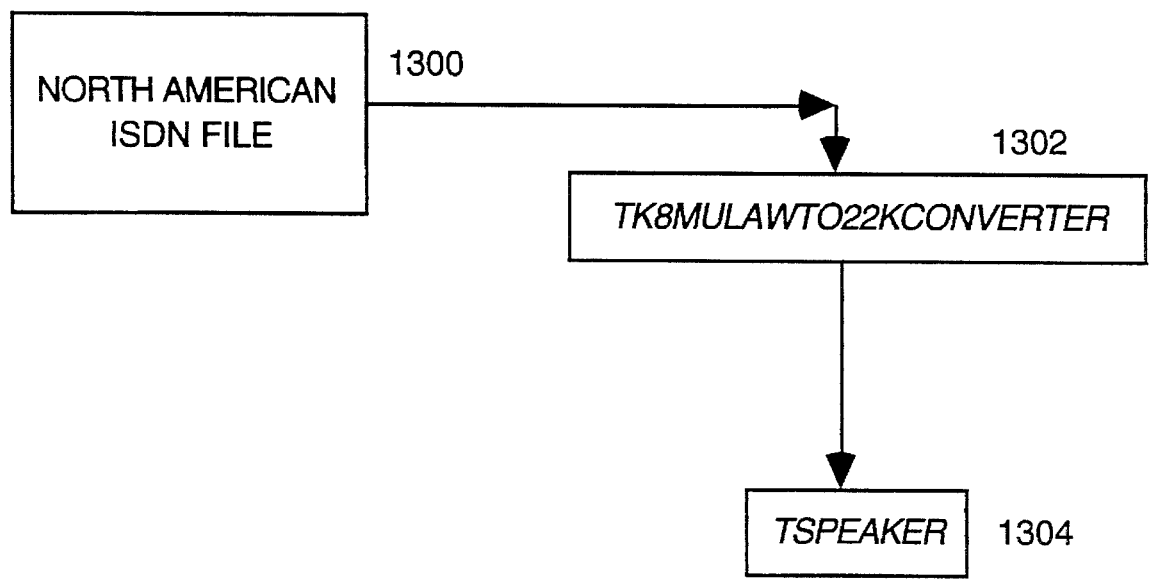
FIG. 13 shows the playback of a sound file in accordance with a preferred embodiment.

FIG. 13 provides an example of playing back a sound file using instances of format conversion objects. To play back a sound file originally recorded directly from a North American ISDN line, for example, one would connect the output port of the file 1300 to the input port of an instance of T8KMuLawTo22KConverter 1302. One would then connect the output port of the converter to the input port of an instance of TSpeaker 1304 and call the file3 s Play member function. Type negotiation is used by audio ports to select a common data format.

CLASS AND MEMBER FUNCTION DETAILS

This section describes in detail the classes and member functions of the present invention which were introduced above.

Figure 14:
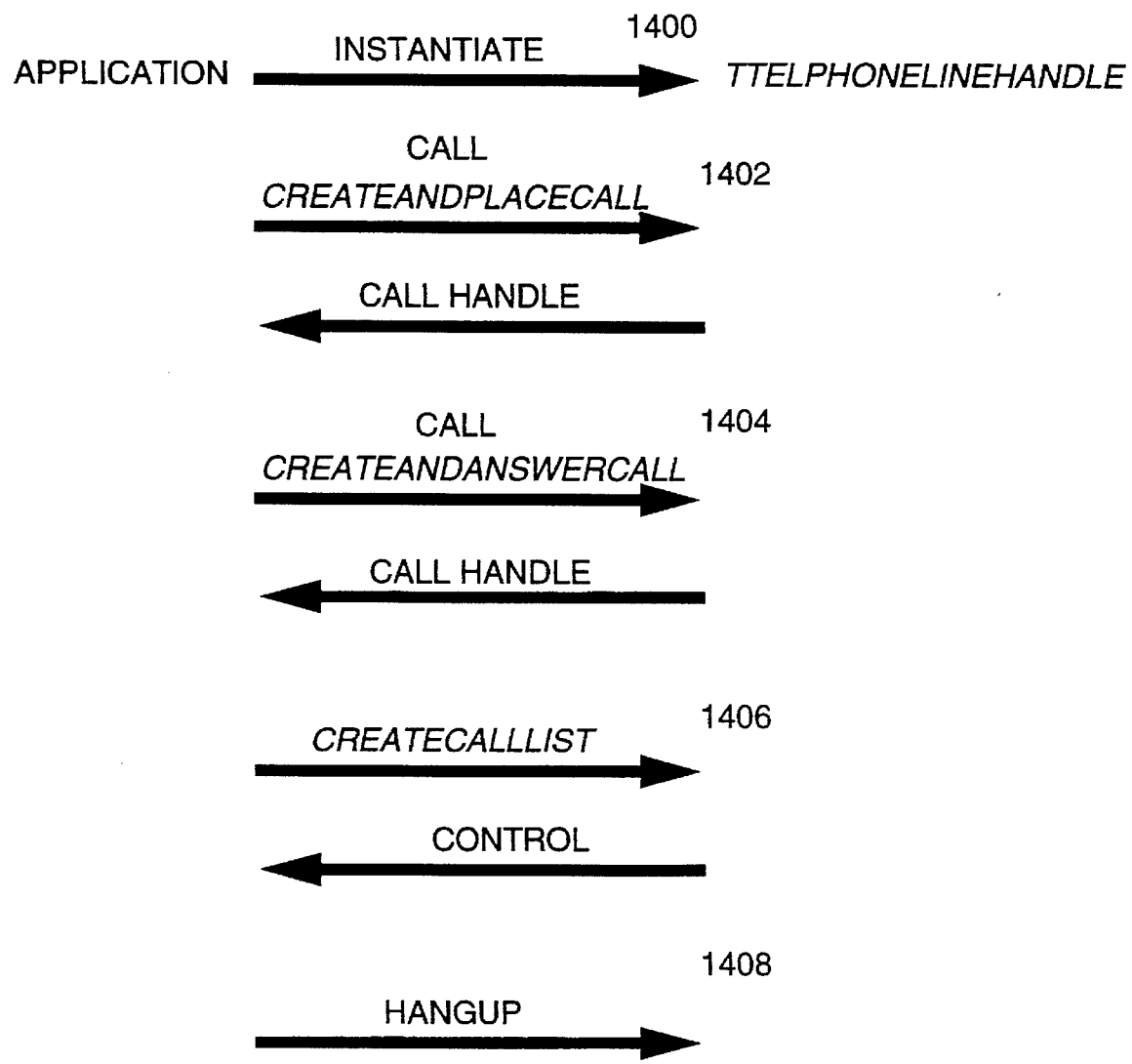
FIG. 14 shows an application interacting with TTelephoneLineHandle to perform various telephony transactions in accordance with a preferred embodiment.

As shown in FIG. 14, to make use of available telephony resources, at 1400 an application instantiates a TTelephoneLineHandle as described above. A telephone connection can then be established by calling the line's CreateAndPlaceCall, represented by 1402, or CreateAndAnswerCall, represented by 1404, methods, both of which return a call handle.

To acquire control of an ongoing connection, the line's CreateCallList method would be used, represented by 1406. Connections initiated in any of these three ways are terminated by calling HangUp on the call handle, represented by 1408.

TTelephoneLineConfigurationData

Figure 15:
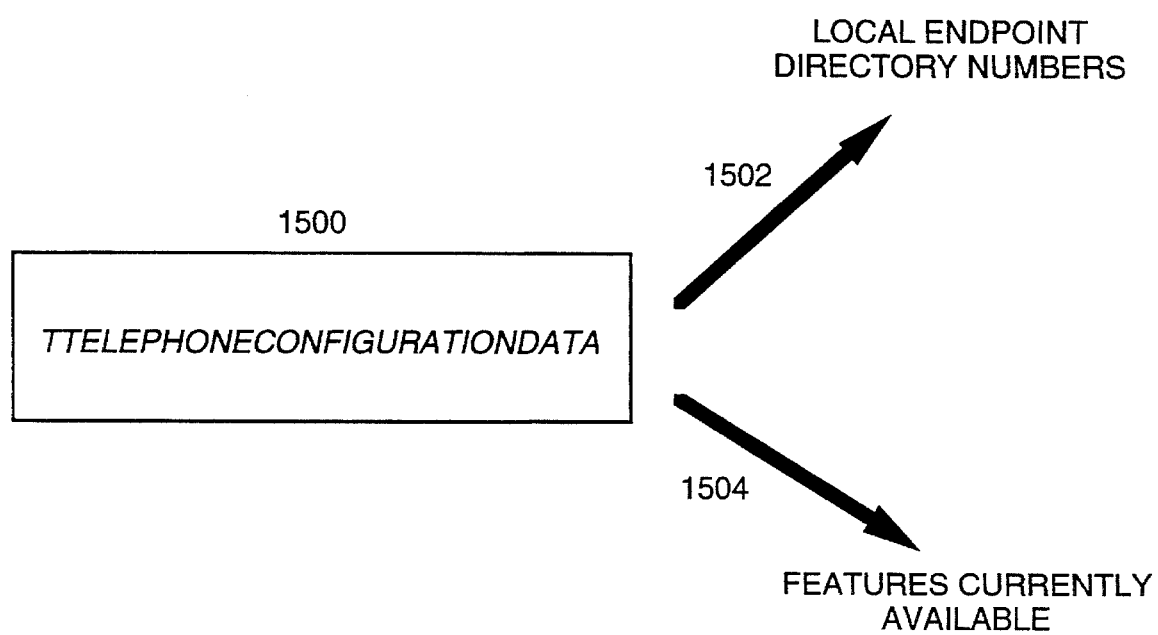
FIG. 15 shows configuration data in accordance with a preferred embodiment.

This class represents the configuration of a specific telephone line. As shown by FIG. 15, TTelephoneLineConfigurationData 1500 identifies the directory numbers associated with the line's local endpoint (1502) and specifies via type negotiation which telephone features are currently available on the line (1504).

TTelephoneLineHandle

Figure 16:
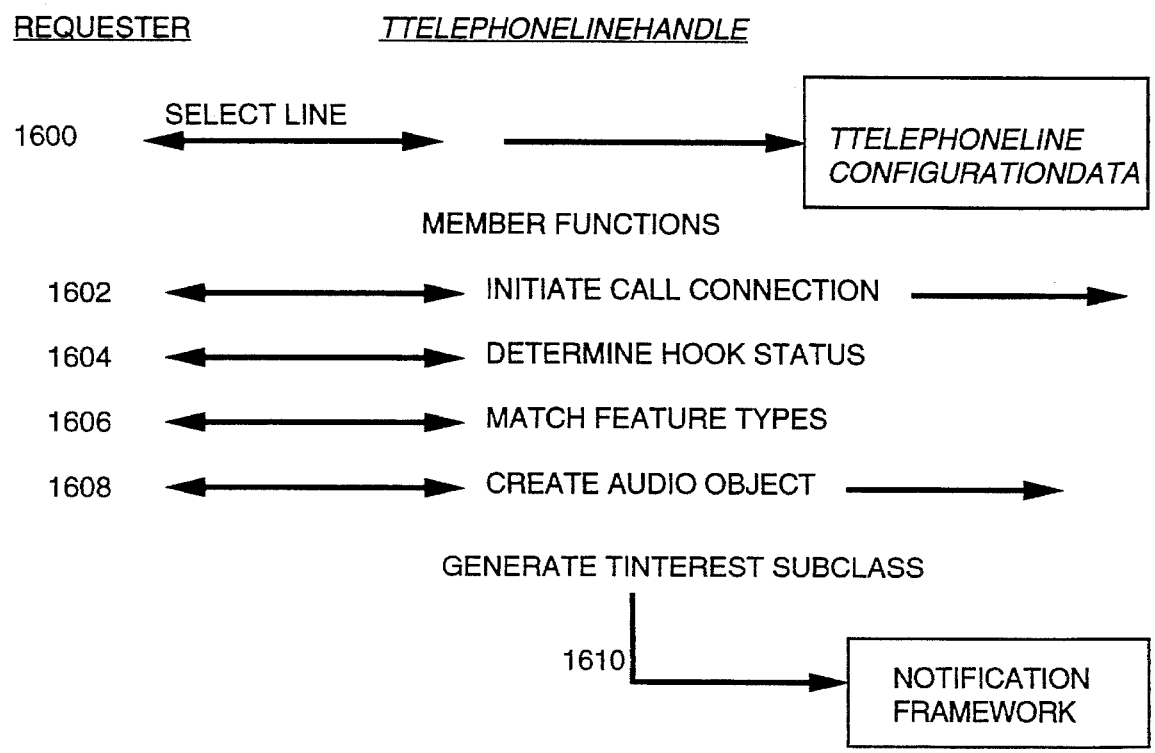
FIG. 16 shows the functions of TTelephoneLineHandle in accordance with a preferred embodiment.

TTelephoneLineHandle has been previously discussed with respect to FIGS. 7 and 8. FIG. 16 shows the functions associated with TTelephoneLineHandle, which is the standard surrogate for a telephone line. It permits selection of a specific line via a telephone line configuration data object (1600) and provides member functions for initiating telephone call connections (1602), determining the hook status of the line (1604), matching telephone feature types via type negotiation (1606), and creating audio objects for the line (1608). It also generates TInterest subclasses to be used by the notification framework (1610) for registering interest in telephony events associated with the line. TTelephoneLineHandle is multi-thread safe, but has not been designed for sharing across team boundaries.

```
class TTelephoneLineConfigurationData:     public MCollectible,
                                            public MTypeNegotiator
//Public constructors
    //Initialize with Collection of Phone Numbers and Sequence of Feature
    //Types, With Phone Numbers Only, or with Single Phone Number
    TTelephoneLineConfigurationData(const Collection& localEndpoint, const
                                    TSequence& featureTypes);
    TTelephoneLineConfigurationData(const TCollection& localEndpoint);
    TTelephoneLineConfigurationData(const TPhoneNumber&);
    //Copy Constructor
    TTelephoneLineConfigurationData(const TTelephoneLineConfigurationData&);
    //Default Constructor for Streaming and Assignment Only
    TTelephoneLineConfigurationData( );
//Destructor
    virtual   ~TTelephoneLineConfigurationData( );
//Assignment Operator TTelephoneLineConfigurationData& operator=(const
    TTelephoneLineConfigurationData&);
//Access Functions
    //Return Endpoint (One or More Phone Numbers) Associated with this Line
           void    GetLocalEndpoint(TPhoneEndpoint&) const;
//MTypeNegotiator Overrides
    //Return List of Active Feature Types
    virtual   void    CreatePreferredTypeList(TSequence&) const;
    //Verify Presence of a Specific Feature Type for Line Represented by
    //this Configuration
    virtual TTypeDescription* ChoosePreferredType(const TSequence&) const;
//MCollectible Overrides
    MCollectibleDeclarationsMacro(TTelephoneLineConfigurationData);
    virtual   long       Hash( ) const;
    virtual   Boolean    IsEqual(const MCollectible*) const;
    virtual   TStream&   operator<<=(TStream& fromWhere);
    virtual   TStream&   operator>>=(TStream& toWhere) const;
```

```
//Public Constructors
    //Initialize With Configuration Data
    TTelephoneLineHandle(const TTelephoneLineConfigurationData&);
    //Copy Constructor
    TTelephoneLineHandle(const TTelephoneLineHandle&);
    //Default Constructor for Streaming and Assignment Only
    TTelephoneLineHandle( );
//Public Destructor
    virtual    ~TTelephoneLineHandle( );
//Assignment Operator
    virtual TTelephoneLineHandle&        operator=(const TTelephoneLineHandle&);
//Application Interface
    //Return Endpoint Represented by This Line
    virtual    void    GetLocalEndpoint(TCollection&) const;
    //Check Hook Status
    virtual    Boolean    IsOnHook( ) const;
    //Create a Call, Dial Number Specified and Return the Call
    virtual TTelephoneCallHandle* CreateAndPlaceCall(const TPhoneNumber&);
    //Create a Call, Answer an Incoming Call and Return the Call
    virtual TTelephoneCallHandle* CreateAndAnswerCall( );
    //Return Feature Control Object Corresponding to Requested Feature Type
    virtual TTelephoneLineFeatureControl* CreateFeatureControl(const
                                TTypeDescription& featureType);
    //Return List of TTelephoneCallHandle Objects for
    //All Connections Currently in Progress on the Telephone Line
    virtual void CreateCallList(TCollection&);
    //Send Out Raw DTMF Digits
    virtual    void        SendDigits(const TPhoneCharacters&);
//Audio I/O
    //Create Speaker and Microphone Audio Objects of Appropriate Type
    virtual    TSpeaker*        CreateSpeaker( );
    virtual    TMicrophone*    CreateMicrophone( );
//Notification Framework Support
    //Return a Hook Status Interest for This Line
    virtual    TInterest*        CreateHookInterest( ) const;
    //Return a Ring Notification Interest for This Line
    virtual    TInterest*        CreateRingInterest( ) const;
    //Return a Call Notification Interest for Specified Call Handle
    virtual    TInterest*        CreateCallInterest(const
                                TTelephoneCallHandle&) const;
    //Return a Feature Notification Interest for Specified Feature Control
    virtual    TInterest*        CreateFeatureInterest(const
                                TTelephoneLineFeatureControl&) const;
//Low-Level Control Functions
    //Take Line Off-Hook
    virtual    void        TakeOffHook( );\
    //Put Line On-Hook
    virtual    void        PutOnHook( );
        //Dial Fully Specified Phone Number
    virtual    void        DialNumber(const TPhoneNumber&);
    //Send Out Raw DTMF Digits
    virtual    void        SendDigits(const TPhoneCharacters&);
//MTypeNegotiator Overrides
    //Negotiate Availability of Controls for Feature Types
    virtual void CreatePreferredTypeList(TSequence&) const;
    virtual TTypeDescription* ChoosePreferredType(const TSequence&) const;
//MCollectible Overrides
    MCollectibleDeclarationsMacro(TTelephoneLineHandle);
    virtual    long        Hash ( ) const;
    virtual    Boolean    IsEqual (const MCollectible*) const;
    virtual    TStream&    operator<<= (TStream& fromWhere);
    virtual    TStream&    operator>>= (TStream& toWhere) const;
```

TTelephoneCallHandle

This is a lightweight surrogate for a telephone connection. It permits clients to determine the remote number participating in the connection and the current status of the call. TTelephoneCallHandle has been discussed previously with respect to FIGS. 9 and 10. TTelephoneCallHandle is multi-thread safe, but has not been designed for sharing across team boundaries.

```
class TTelephoneCallHandle : public MCollectible
//Note: This class must be created via a line or line handle
//Destructor
        virtual   ~TTelephoneCallHandle( );
//Client Interface
        //Extract Remote Telephone Number for Connection
        void      GetRemoteNumber(TPhoneNumber& theNum) const;
        //Return Current Call Status
        virtual   TToken      GetStatus( ) const;
        //Hang Up the Call
        virtual   void        HangUp( );
//MCollectible Overrides
        MCollectibleDeclarationsMacro(TTelephoneCallHandle);
        virtual   long        Hash ( ) const;
        virtual   Boolean     IsEqual (const MCollectible*) const;
//Note: Clients may not assign or stream this class.
```

TTelephoneLineFeatureControl

Figure 17:
FIG. 17 shows the functions of TTelephoneLineFeatureControl in accordance with a preferred embodiment.

FIG. 17 shows the creation, at 1700, of TTetephone-LineFeatureControl by TTelephoneLineHandle in response to a client. TTelephoneLineHandles may or may not be capable of supporting arbitrary sets of features above and beyond the ability to make and break telephone connections. For example, a line handle may be able to place a call on hold, transfer a call, conference in a new call, or forward itself to a different line. Clients access features such as these by asking the line handle to create a subclass of TTelephone-LineFeatureControl. Feature control subclasses are specified by means of TTypeDescriptions based on the class names of the desired features. TTelephoneLineFeature-Control is multi-thread safe, but has not been designed for sharing across team boundaries.

Standard TTelephoneLineFeatureControl Subclasses

Five standard feature control subclasses have been provided, corresponding to the "Big Four" supplementary features plus call forwarding.

```
class TTelephoneLineFeatureControl : public MCollectible
//Static Members for accessing defined Feature Types defined by;
static const void GetHoldFeatureType(TTypeDescription&);
static const void GetDropFeatureType(TTypeDescription&);
static const void GetTransferFeatureType(TTypeDescription&);
static const void GetConferenceFeatureType(TTypeDescription&);
static const void GetForwardFeatureType(TTypeDescription&);
//Note: This class must be created via a line or line handle
//Public Destructor
virtual   ~TTelephoneLineFeatureControl( );
Client Interface
        //Return Feature Type Description
        virtual   void        GetFeatureType(TTypeDescription&) const = 0;
        //Return Current Feature Status
        virtual   TToken      GetStatus( ) const;
//MCollectible Overrides
        MCollectibleDeclarationsMacro(TTelephoneLineFeatureControl);
        virtual   long        Hash ( ) const;
        virtual   Boolean     IsEqual (const MCollectible*) const;
//Note: Clients may not assign or stream this class.
```

```
1) Hold Feature Control:
class TTelephoneHoldFeatureControl : public TTelephoneLineFeatureControl
//Public Destructor
virtual        ~TTelephoneHoldFeatureControl( );
//TTelephoneLineFeatureControl Override
    //Return Feature Type Description
    virtual   void        GetFeatureType(TTypeDescription&) const;
```

-continued

```
//Client Interface
    //Put Currently Active Call On Hold
        virtual    void       PutOnHold( );
    //Recover Specified Call
        virtual    void       Reconnect(const TTelephoneCallHandle&);
//MCollectible Overrides
    MCollectibleDeclarationsMacro(TTelephoneHoldFeatureControl);
        virtual    long       Hash( ) const;
        virtual    Boolean    IsEqual(const MCollectible*) const;
2) Drop Feature Control:
class TTelephoneDropFeatureControl : public TTelephoneLineFeatureControl
//Public Destructor
virtual        ~TTelephoneDropFeatureControl( );
//TTelephoneLineFeatureControl Override
    //Return Feature Type Description
        virtual    void       GetFeatureType(TTypeDescription&) const;
//Client Interface
    //Drop Specified Call
        virtual    void       Drop(const TTelephoneCallHandle&);
//MCollectible Overrides
    MCollectibleDeclarationsMacro(TTelephoneDropFeatureControl);
        virtual    long       Hash( ) const;
        virtual    Boolean    IsEqual(const MCollectible*) const;
3) Transfer Feature Control:
class TTelephoneTransferFeatureControl: public TTelephoneLineFeatureControl
//Public Destructor
        virtual    ~TTelephoneTransferFeatureControl( );
//TTelephoneLineFeatureControl Override
    //Return Feature Type Description
        virtual    void       GetFeatureType(TTypeDescription&) const;
//Client Interface
    //Initiate Transfer and Place Call to Specified Number
        virtual TTelephoneCallHandle* CreateCallAndStartTransfer(const
                                TPhoneNumber& newNumber);
    //Finish Ongoing Transfer Operation
        virtual    void       CompleteTransfer( );
    //Abort Ongoing Transfer Operation
        virtual    void       CancelTransfer( );
//MCollectible Overrides
    MCollectibleDeclarationsMacro(TTelephoneTransferFeatureControl);
        virtual    long       Hash( ) const;
        virtual    Boolean    IsEqual(const MCollectible*) const;
4) Conference Feature Control:
class TTelephoneConferenceFeatureControl: public TTelephoneLineFeatureControl
//Public Destructor
        virtual    ~TTelephoneConferenceFeatureControl( );
//TTelephoneLineFeatureControl Override
    //Return Feature Type Description
        virtual    void       GetFeatureType(TTypeDescription&) const;
//Client Interface
    //Initiate Conference Operation and Place Call to Specified Number
        virtual TTelephoneCallHandle* CreateCallAndStartAddingToConference(const
                                TPhoneNumber& newNumber);
    //Complete Ongoing Conference Operation
        virtual    void       FinishAddingToConference( );
    //Abort Ongoing Conference Operation
        virtual    void       CancelAddingToConference( );
//MCollectible Overrides
    MCollectibleDeclarationsMacro(TTelephoneConferenceFeatureControl)
        virtual    long       Hash( ) const;
        virtual    Boolean    IsEqual(const MCollectible*) const;
5) Forward Feature Control:
class TTelephoneForwardFeatureControl : public TTelephoneLineFeatureControl
//Public Destructor
virtual         ~TTelephoneForwardFeatureControl( );
//TTelephoneLineFeatureControl Override
    //Return Feature Type Description
        virtual    void       GetFeatureType(TTypeDescription&) const;
//Client Interface
    //Forward Line to Specified Number
        virtual    void       Forward(const TPhoneNumber& phoneNumber);
    //Cancel Call Forwarding
        virtual    void       CancelForward( );
//MCollectible Overrides
    MCollectibleDeclarationsMacro(TTelephoneForwardFeatureControl);
        virtual    long       Hash( ) const;
        virtual,   Boolean    IsEqual(const MCollectible*) const;
```

TTelephoneHandsetConfigurationData

This class represents the configuration of a specific telephone handset. It identifies the telephone line or lines to which the handset may be connected. This has been discussed with respect to FIG. 15.

events associated with the handset. As a physical device, a handset normally provides manual control for a specific telephone line so that lifting the handset causes some telephone line somewhere to go off hook. Before being used for audio I/O, the handset must be "Disconnected" from its

```
class TTelephoneHandsetConfigurationData : public MCollectible
//Constructors
//Initialize with Configuration(s) of Telephone Lines to Which Handset
//Can be Connected
TTelephoneHandsetConfigurationData(const TCollection&);
TTelephoneHandsetConfigurationData(const TTelephoneLineConfigurationData&);
//Copy Constructor
TTelephoneHandsetConfigurationData(const TTelephoneHandsetConfigurationData&);
//Default Constructor for Streaming and Assignment Only
TTelephoneHandsetConfigurationData( );
//Destructor
virtual        ~TTelephoneHandsetConfigurationData( );
//Assignment Operator
TTelephoneHandsetConfigurationD&       operator=(const
                                       TTelephoneHandsetConfigurationData&);
//Access Function
    //Create Configuration Data Objects for All Telephone Lines to Which
    //the Handset Can Be Connected
    virtual void CreateConnectibleLineConfigurations(TCollection&) const;
//MCollectible Overrides
    MCollectibleDeclarationsMacro(TTelephoneHandsetConfigurationData);
    virtual   long       Hash ( )const;
    virtual   Boolean    IsEqual(const MCollectible*) const;
    virtual   TStream&   operator<<=(TStream& fromWhere);
    virtual   TStream&   operator>>=(TStream& toWhere) const;
```

TTelephoneHandsetHandle

Figure 18:
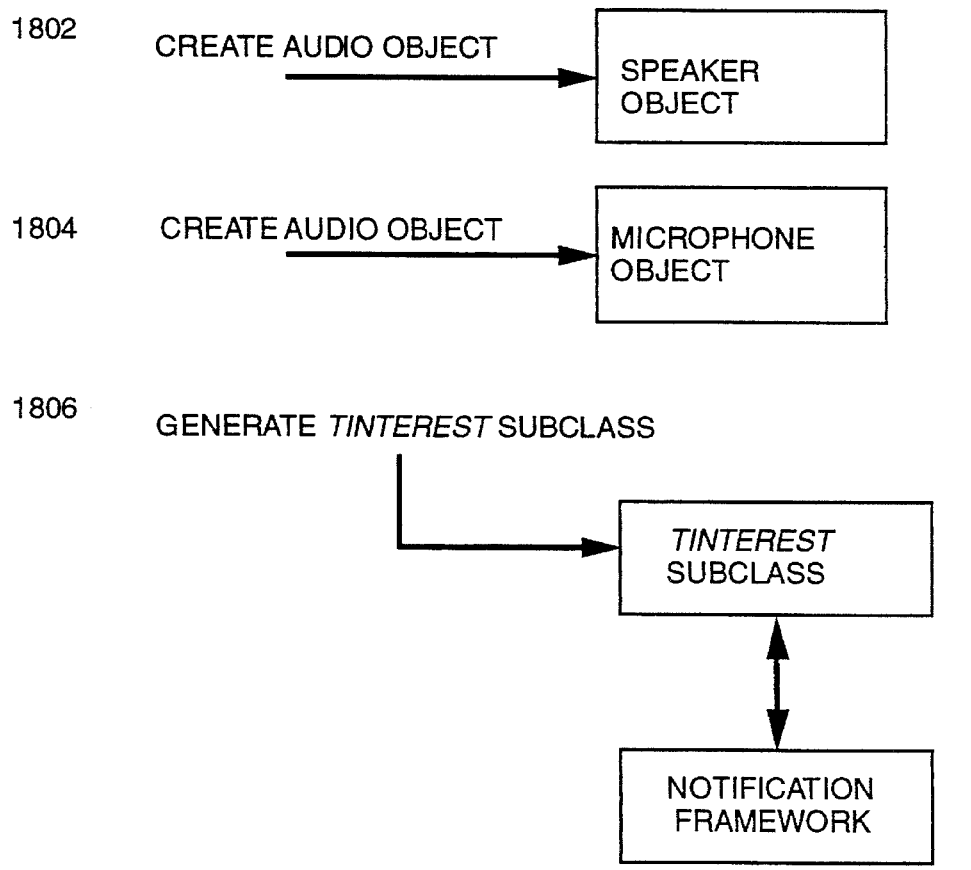
FIG. 18 shows the functions of TTelephoneHandsetHandle in accordance with a preferred embodiment.

FIG. 18 provides a functional representation of TTelephoneHandsetHandle, which is the standard surrogate for the physical telephone terminal equipment. It provides a mechanism for monitoring hook status (1800) and permits the creation of audio objects (1802, 1804) corresponding to the handset's internal speaker and microphone. It also generates TInterest subclasses to be used by the notification framework (1806) for registering interest in telephony line. It is also possible to connect a handset to one of a set of phone lines. TTelephoneHandsetHandle is multi-thread safe, but has not been designed for sharing across team boundaries.

```
class TTelephoneHandsetHandle : public MCollectible
//Public Constructors
    //Initialize With Configuration Data
    TTelephoneHandsetHandle(const TTelephoneHandsetConfigurationData&);
    //Copy Constructor
    TTelephoneHandsetHandle(const TTelephoneHandsetHandle&);
    //Default Constructor for Streaming and Assignment Only
    TTelephoneHandsetHandle( );
//Public Destructor
virtual        ~TTelephoneHandsetHandle( );
//Assignment Operator
virtual TTelephoneHandsetHandle& operator=(const TTelephoneHandsetHandle&);
//Application Interface
    //Check Hook Status
    virtual   Boolean         IsOnHook( ) const;
    //Check Connection Status
    virtual   Boolean         IsConnected( ) const;
    //Connect to a Specific Phone Line
    //Note: Handset May be Connected to Only One Line at a Time
    virtual void ConnectToTelephoneLine(const TTelephoneLineHandle&);
    //Disconnect from a Specific Phone Line
    virtual void DisconnectFromTelephoneLine( );
    //Create Configuration for Line Currently Connected to This Handset
    virtual TTelephoneLineConfigurationData* CreateLineConfigurationData( )
                                       const;
    //Create Configuration Data Objects for All Lines Available for
    //Connection to this Handset
    virtual void CreateConnectibleLineConfigurations(TCollection&) const;
```

-continued

```
//Audio I/O
    //Create Speaker and Microphone Audio Objects of Appropriate Type
    //Note: These Objects represent the Audio I/O capability of the
    //     Handset itself and not of the line it is connected to
    virtual   TSpeaker*       CreateSpeaker( );
    virtual   TMicrophone*    CreateMicrophone( );
//Notification Framework Support
    //Return a Hook Status Interest for This Handset
    virtual   TInterest*      CreateHookInterest( ) const;
    //Return a Ring Notification Interest for This Handset
    virtual   TInterest*      CreateRingInterest( ) const;
//MCollectible Overrides
    MCollectibleDeclarationsMacro(TTelephoneHandsetHandle);
    virtual   long            Hash ( ) const;
    virtual   Boolean         IsEqual (const MCollectible*) const;
    virtual   TStream&        operator<<=(TStream& fromWhere);
    virtual   TStream&        operator>>=(TStream& toWhere) const;
```

TInterest Subclasses

Figure 19:
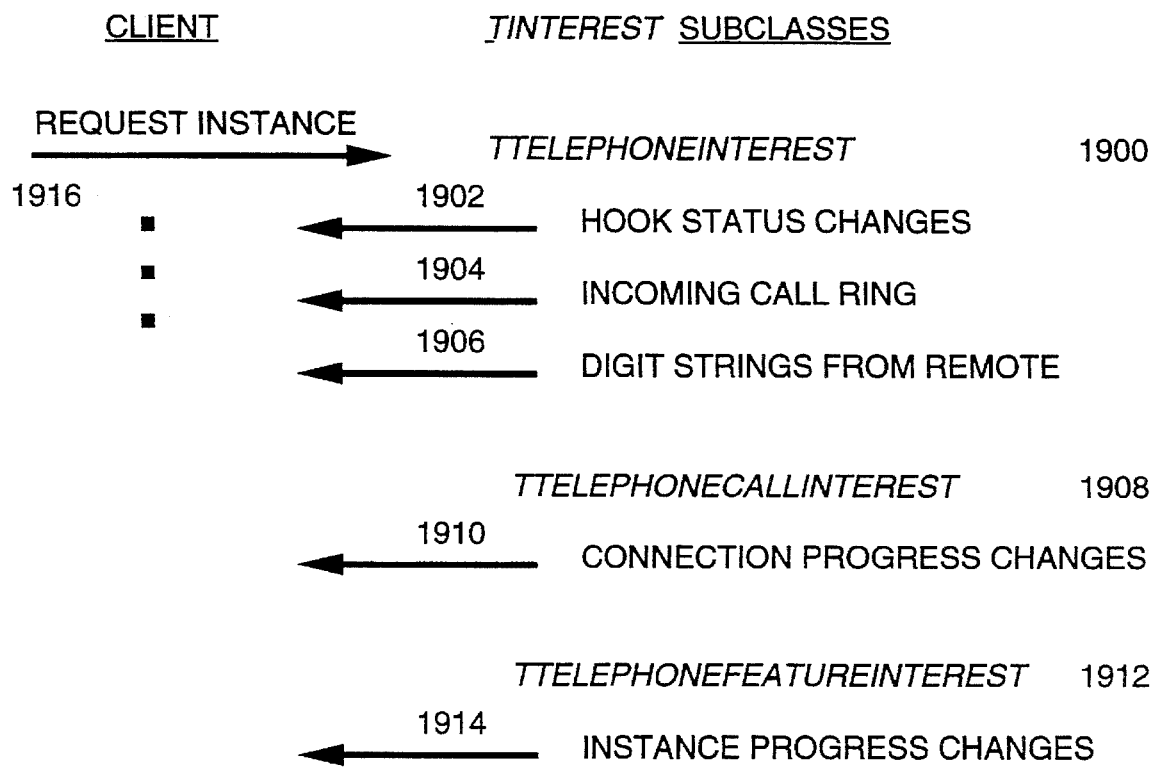
FIG. 19 shows TInterest subclasses in accordance with a preferred embodiment.

FIG. 19 shows TInterest subclasses. The present invention makes use of three specialized TInterest subclasses to communicate status updates: TTelephoneInterest 1900, TTelephoneCallInterest 1908, and TTelephoneFeatureInterest 1912. TTelephoneInterest 1900 permits clients to request notification of certain telephony events affecting a particular telephone line or handset. These events include changes in hook status 1902, ring indications from incoming calls 1904, and the arrival of remotely generated digit strings 1906. TTelephoneCallInterest 1908 permits clients to request notification of changes in the progress of a particular telephone connection 1910. TTelephoneFeatureInterest 1912 likewise permits clients to request notification of changes in the progress of a particular instance of a telephone feature 1914. Clients should create instances 1916 of the above classes by calling the appropriate member functions provided by TTelephoneLineHandle and TTelephoneHandsetHandle. None of them is multi-thread safe.

```
• TTelephoneInterest
class TTelephoneInterest : public TInterest
//Public Constructors
TTelephoneInterest(const TTelephoneInterest&);
TTelephoneInterest( );
//Public Destructor
virtual       ~TTelephoneInterest( );
//Assignment Operator
virtual TTelephoneInterest& operator= (const TTelephoneInterest&);
//MCollectible Overrides
        MCollectibleDeclarationsMacro(TTelephoneInterest);
        virtual   long         Hash ( ) const;
        virtual   Boolean      IsEqual(const MCollectible*) const;
        virtual   TStream&     operator<<=(TStream& fromWhere);
        virtual   TStream&     operator>>=(TStream& toWhere) const;
• TTelephoneCallInterest
class TTelephoneCallInterest : public TInterest
//Public Constructors
TTelephoneCallInterest(const TTelephoneCallInterest&);
TTelephoneCallInterest( );
//Public Destructor
virtual       ~TTelephoneCallInterest( );
//Assignment Operator
virtual TTelephoneCallInterest& operator= (const TTelephoneCallInterest&);
//MCollectible Overrides
        MCollectibleDeclarationsMacro(TTelephoneCallInterest);
        virtual   long         Hash ( ) const;
        virtual   Boolean      IsEqual(const MCollectible*) const;
        virtual   TStream&     operator<<=(TStream& fromWhere);
        virtual   TStream&     operator>>=(TStream& toWhere) const;
• TTelephoneFeatureInterest
class TTelephoneFeatureInterest : public TInterest
//Public Constructors
TTelephoneFeatureInterest(const TTelephoneFeatureInterest&);
TTelephoneFeatureInterest( );
//Public Destructor
virtual       ~TTelephoneFeatureInterest( );
//Assignment Operator
virtual        TTelephoneFeatureInterest& operator=(const
                                      TTelephoneFeatureInterest&);
//MCollectible Overrides
        MCollectibleDeclarationsMacro(TTelephoneFeatureInterest);
        virtual   long         Hash ( ) const;
        virtual   Boolean      IsEqual(const MCollectible*) const;
        virtual   TStream&     operator<<=(TStream& fromWhere);
        virtual   TStream&     operator>>=(TStream& toWhere) const;
```

Interest Name Constants

The following public static constants are defined for use with the Notification Framework:

```
• Interest names defined within the scope of TTelephoneInterest
    //Hook Status Update
    static const TToken& kHookStatus;
    //Telephone Ring Interest Name
    static const TToken& kRingNotification;
    //TTelephone Digits Interest Name
    static const TToken& kDigitsReceived;
• Interest names defined within the scope of
TTelephoneCallInterest:
    //Call Status
    static const TToken& kCallStatus;
• Interest names defined within the scope of
TTelephoneFeatureInterest:
    //Telephone Feature Status
    static const TToken& kFeatureStatus;
```

Notification Subclasses

Figure 20:
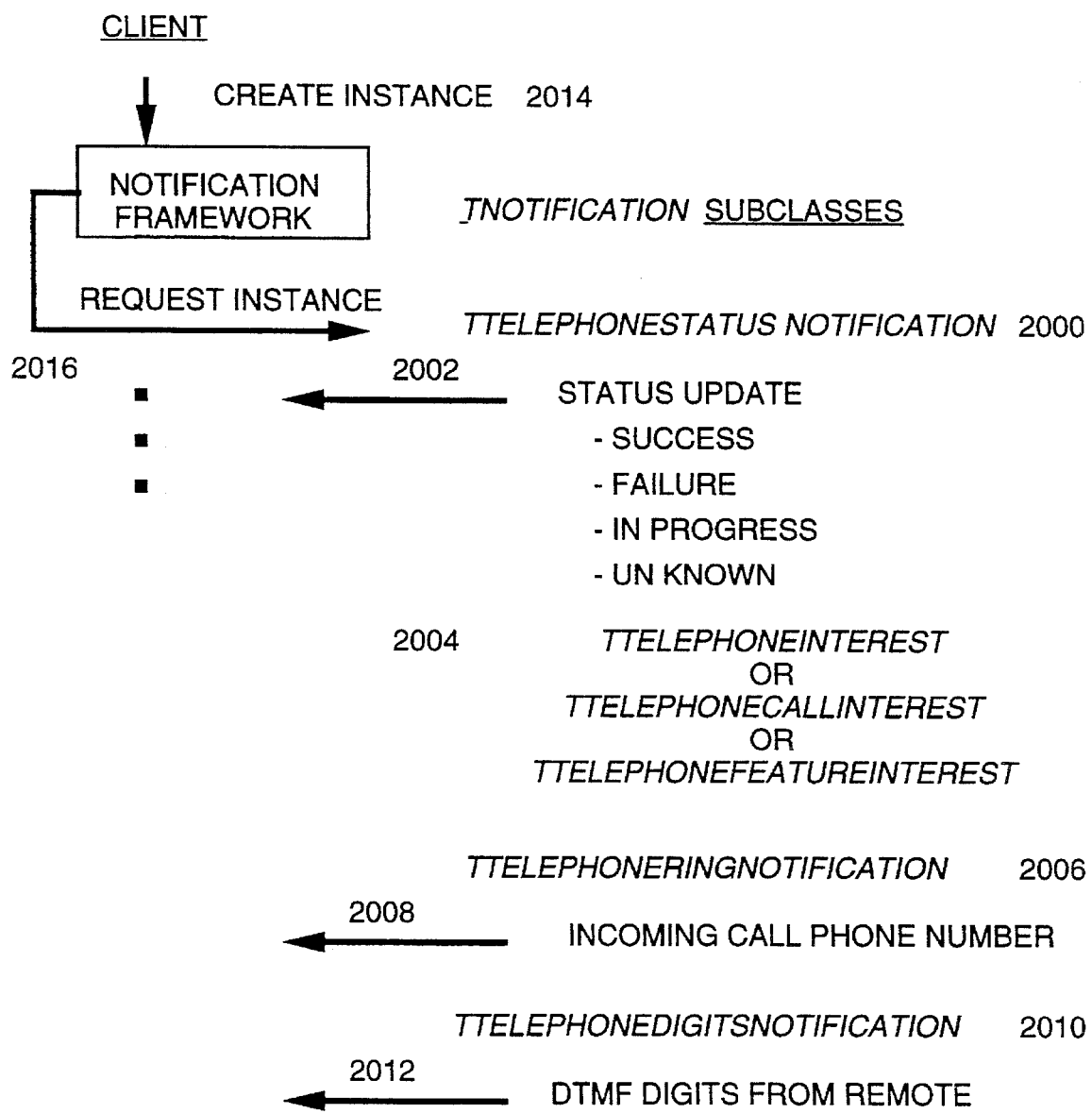
FIG. 20 shows TNotification subclasses in accordance with a preferred embodiment.

FIG. 20 shows the functional relationships which result from TNotification subclasses. There are three telephony-oriented subclasses of TNotification. TTelephoneStatusNotification 2000 transports a status update 2002 and contains a TTelephoneInterest, a TTelephoneCallInterest, or a TTelephoneFeatureInterest (2004) in place of a plain TInterest. Status updates may be assigned to one of four categories, depending upon the progress of the operation with which they are associated: Success, Failure, In Progress, or Unknown. This permits applications to perform a preliminary classification of an incoming notification without explicitly examining its status field. TTelephoneRingNotification 2006 transports the phone number of an incoming call before it has been answered 2008. Finally, TTelephoneDigitsNotification 2010 transports raw DTMF digits from a remotely connected telephone's keypad 2012. Clients will typically obtain instances 2014 of these classes via the Notification Framework 2016 rather than by creating instances of their own. These classes are not multi-thread safe.

- Status Notification:
```
class TTelephoneStatusNotification : public TNotification
//Public Constructors
TTelephoneStatusNotification(const TTelephoneStatusNotification&);
TTelephoneStatusNotification(const TInterest&);
//Public Destructor
virtual~TTelephoneStatusNotification( );
//Assignment Operator
virtual    TTelephoneStatusNotification&        operator= (const
           TTelephoneStatusNotification&);
//Client Interface
//Get/Set Status Information
      TToken    GetStatus( ) const;
//Get Notification Classification
      long      GetClassification( ) const;
//MCollectible Overrides
      MCollectibleDeclarationsMacro(TTelephoneStatusNotification);
      virtual    long       Hash ( ) const;
      virtual    Boolean    IsEqual(const MCollectible*) const;
      virtual    TStream&   operator<<=(TStream& fromWhere);
      virtual    TStream&   operator>>=(TStream& toWhere) const;
```
- Ring Notification:
```
class TTelephoneRingNotification : public TNotification
//Public Constructors
TTelephoneRingNotification(const TPhoneNumber&);
TTelephoneRingNotification( );
TTelephoneRingNotification(const TTelephoneRingNotification&);
//Public Destructor
virtual       ~TTelephoneRingNotification( );
//Assignment Operator
virtual       TTelephoneRingNotification&     operator= (const
                                              TTelephoneRingNotification&);
//Client Interface
      //Extract Calling Party Telephone Number
      void      GetIncomingNumber(TPhoneNumber&) const;
//MCollectible Overrides
      MCollectibleDeclarationsMacro(TTelephoneRingNotification);
      virtual    long       Hash ( ) const;
      virtual    Boolean    IsEqual(const MCollectible*) const;
      virtual    TStream&   operator<<=(TStream& fromWhere);
      virtual    TStream&   operator>>=(TStream& toWhere) const;
```
- Incoming Digits Notification:
```
class TTelephoneDigitsNotification : public TNotification
//Public Constructors
      TTelephoneDigitsNotification(const TTelephoneDigitsNotification&);
      TTelephoneDigitsNotification( );
//Public Destructor
      virtual    ~TTelephoneDigitsNotification( );
//Assignment Operator
virtual       TTelephoneDigitsNotification&    operator= (const
                                               TTelephoneDigitsNotification&);
//Client Interface
      void      GetDigits(TPhoneCharacters&) const;
//MCollectible Overrides
      MCollectibleDeclarationsMacro(TTelephoneDigitsNotification);
      virtual    long       Hash ( ) const;
      virtual    Boolean    IsEqual(const MCollectible*) const;
      virtual    TStream&   operator<<=(TStream& fromWhere);
      virtual    TStream&   operator>>=(TStream& toWhere) const;
```

Status Constants

The following public static constant TToken references are defined for telephone status updates within the scope of TTelephoneStatusNotification::
Line status constants
  kOnHook—Line or handset is on hook.
  kOffHook—Line or handset is off hook.
Call status constants
  kCallIdle—Call is inactive. The default state.
  kIncompleteCallInfo—Call placement is in progress but more information is needed.
  kCallReorder—Call placement could not proceed. There was an error in the number.
  kCallCannotComplete—Call placement could not be completed.
  kReadyToDial—Dial tone is present.
  kFastBusy—Dial tone timed out.
  kDialingComplete—Dialout completed successfully.
  kRingbackDetected—A ringback indication was received. The destination phone is ringing.
  kBusyDetected—A busy indication was received. The destination phone number is busy.
  kNoAnswer—The destination phone number was not answered.
  kCallActive—The call has been successfully connected.
  kCallOnHold—The call has been put on hold.
  kCallTerminationDetected—The network or the connected party has terminated the call.
Feature control constants kActivateInProgress—The feature activation request was acknowledged.
kActivateComplete—The feature is now activated.
kCannotActivate—The feature could not be activated.
kDeactivateInProgress—The feature deactivation request was acknowledged.
kDeactivateComplete—The feature is now deactivated.
kCannotDeactivate—The feature could not be deactivated.
kErrorState—An unidentified error occurred.

ETelephones tatusClassification

ETelephoneStatusClassification is an enemy defined within the scope of
TTelephoneStatusNotification: to denote the generic classification of a status notification so that clients can respond appropriately without examining the state value. Defined values are:
kSuccess—Operation Completed Successfully
kFailure—Operation Prevented from Being Completed
kinProgress—Operation Is Proceeding Normally
kUnknown—Progress of Operation is Unknown for this State Converter Classes Data format conversion is accomplished via converters such as T8KMuLawTo22KConverter, T8KALawTo22K-Converter, T22KTo8KMuLawConverter, and T22KTo8KALawConverter. These classes inherit from MAudio and add no new interface protocol of their own.

II. Objects for telephony system developers

In addition to the objects discussed above, telephony systems developers will need to have further objects to work with when developing new telephony equipment. For example, third party developers such as AT&T who may wish to add support for proprietary phone equipment and/or to extend the present invention to accommodate advanced telecommunications capabilities. The present invention will make these efforts of third party developers as quick and painless as possible. The telephone architecture should anticipate the need for such extensions while maximizing potential reuse of the existing code associated with standard objects.

Architectural Overview of Objects

Figure 21:
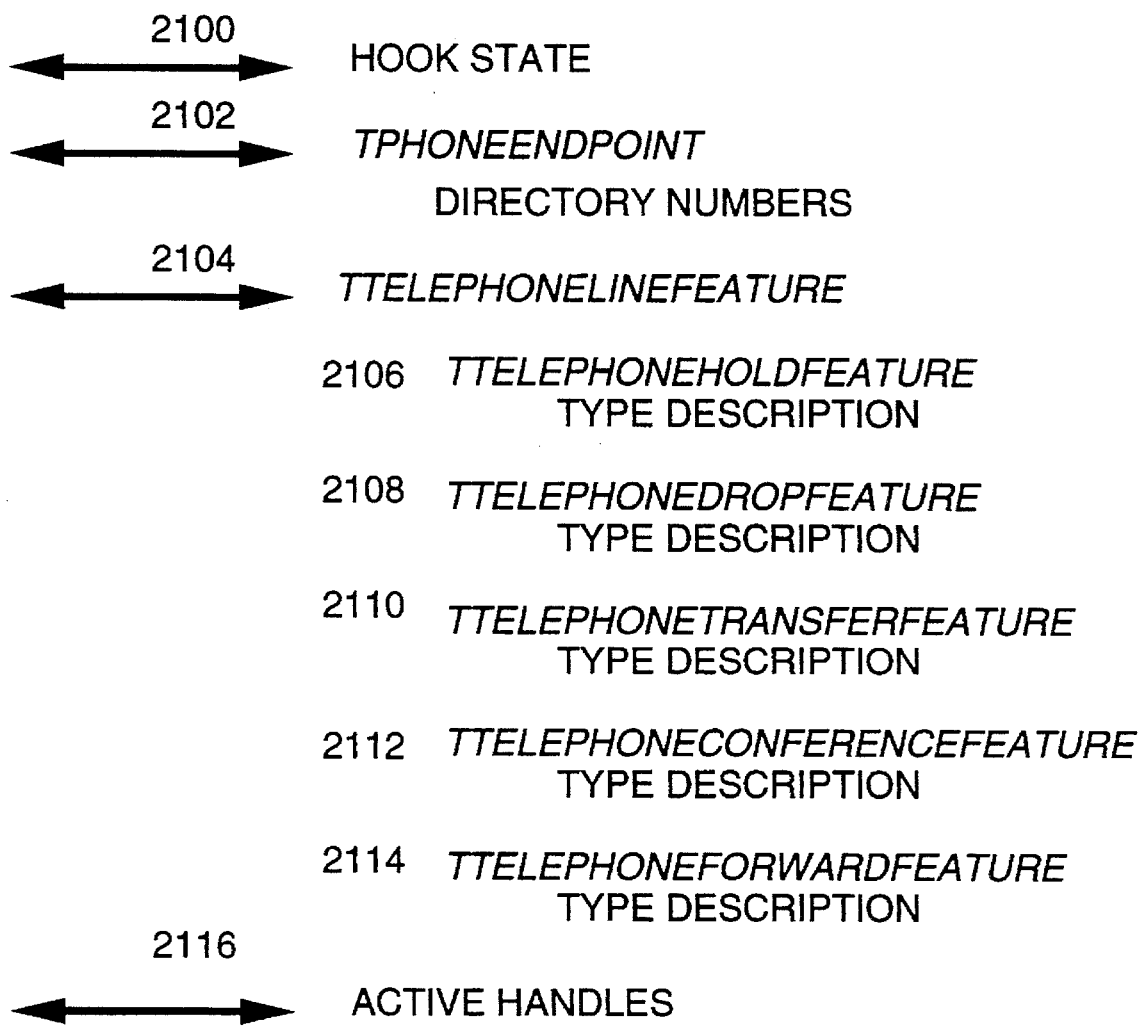
FIG. 21 shows the functional characteristics of TTelephoneLine in accordance with a preferred embodiment.

Telephony Developers need to concern themselves with three classes which were not described above in the applications section. The abstract Telephone Line class defines a standard interface to telephone network functions. It has a master-surrogate relationship vis-`a-vis TTelephoneLine-Handle and contains a built-in mechanism for communicating with its handles, which may exist in multiple teams. An interface for accessing common supplementary features beyond simple on/off hook and dialing functions is provided by TTelephoneFeature and its subclasses. Developers wishing to provide access to standard functionality on proprietary telephony hardware will need to produce subclasses of the line class and the predefined feature subclasses. Telephone Lines FIG. 21 represents the abstract base class TTelephoneLine which provides a software model of the physical connection to the telephone network. With each phone line is associated (1) a hook state (on or off) 2100, (2) a TPhoneEndpoint containing a unique set of Directory Numbers 2102 and (3) a collection of its available telephony features 2104. In addition, a line manages a list of active handles 2116 to which it directs notification of status updates.

TTelephoneLine contains pure virtual member functions for going offhook, going on-hook, and dialing out digits. Implementations for each of these functions must be provided by the developer. In most cases, such implementation will require communication with an I/O Access Manager and/or a listener task specific to a given hardware/software environment.

If, for example, the physical telephone interface were resident on a nu-bus card running a particular Task A, the role of the device driver might be filled by a TaskACard object instantiated as a member field of the TTelephoneLine subclass. A call to the subclass's OffHook method would cause the line to send a message containing the appropriate command and data to the TaskACard. Responses would be routed back to the line via a listener task containing a TaskAListener. The line subclass would then create the appropriate TNotification subclasses and pass them down to associated TTelephoneLineHandles via the ReceiveUpdate method inherited from TTelephoneLine.

Two additional member functions which may be of interest to a developer are CreateSpeaker, and CreateMicrophone. These two functions have default implementations which simply return a NIL pointer. The request dispatcher, however, is set up to flatten non-NIL pointers for resurrection by the TTetephoneLineHandle on the other side. A preferred embodiment includes audio objects corresponding to the actual telephony hardware and appropriate calls to the sound server to instantlate these objects. Note that in many cases (e.g. a standard external modem connected over the serial port) it will not be possible to pass actual voice data in or out of the host computer and the default implementations will, unfortunately, have to be retained.

It is the responsibility of the TTelephoneLine subclass to ensure that the notification events expected by the line handle and call handle classes are generated in the proper sequence. Telephone Features In order to provide advanced features beyond those required for setting up and tearing down connections, it is contemplated that the basic TTelephoneLine class support dispatching and processing of requests for advanced telephony features such as "hold", "drop", "transfer", "conference" and "forward", to name five of the more popular ones. The specific set of features available on a given telephone switch depends both upon the inherent capabilities of the switch, and upon the services the switch customer has chosen to subscribe for. Because of this and because of the fact that switch manufacturers come up with newer and fancier features each year, TTelephoneLine operates on a heterogeneous set of features, polymorphically activating and deactivating them.

Continuing with FIG. 21, the subclasses of TTelephoneLineFeature are shown. TTelephoneLineFeature is the base class from which all features derive and which defines the activation/deactivation protocol. From TTelephoneLineFeature 2104 is derived a set of standard feature subclasses: TTelephoneHoldFeature 2106, TTelephoneDropFeature 2108, TTelephoneTransferFeature 2110, TTelephoneConferenceFeature 2112, and TTelephoneForwardFeature 2114. With each of these is associated a type description to be used by any subclass which preserves the feature's control protocol. Standard type descriptions for the five features listed above are provided by TTelephoneLineFeatureControl via static member functions.

A developer who wishes to provide implementations for the standard feature set must create subclasses of TTelephoneHoldFeature 2106, TTelephoneDropFeature 2108, TTelephoneTransferFeature 2110, TTetephoneConferenceFeature 2112 and TTelephoneForwardFeature 2114, overriding the inherited pure virtual functions Activate and Deactivate so that useful work is performed.

Figure 22:
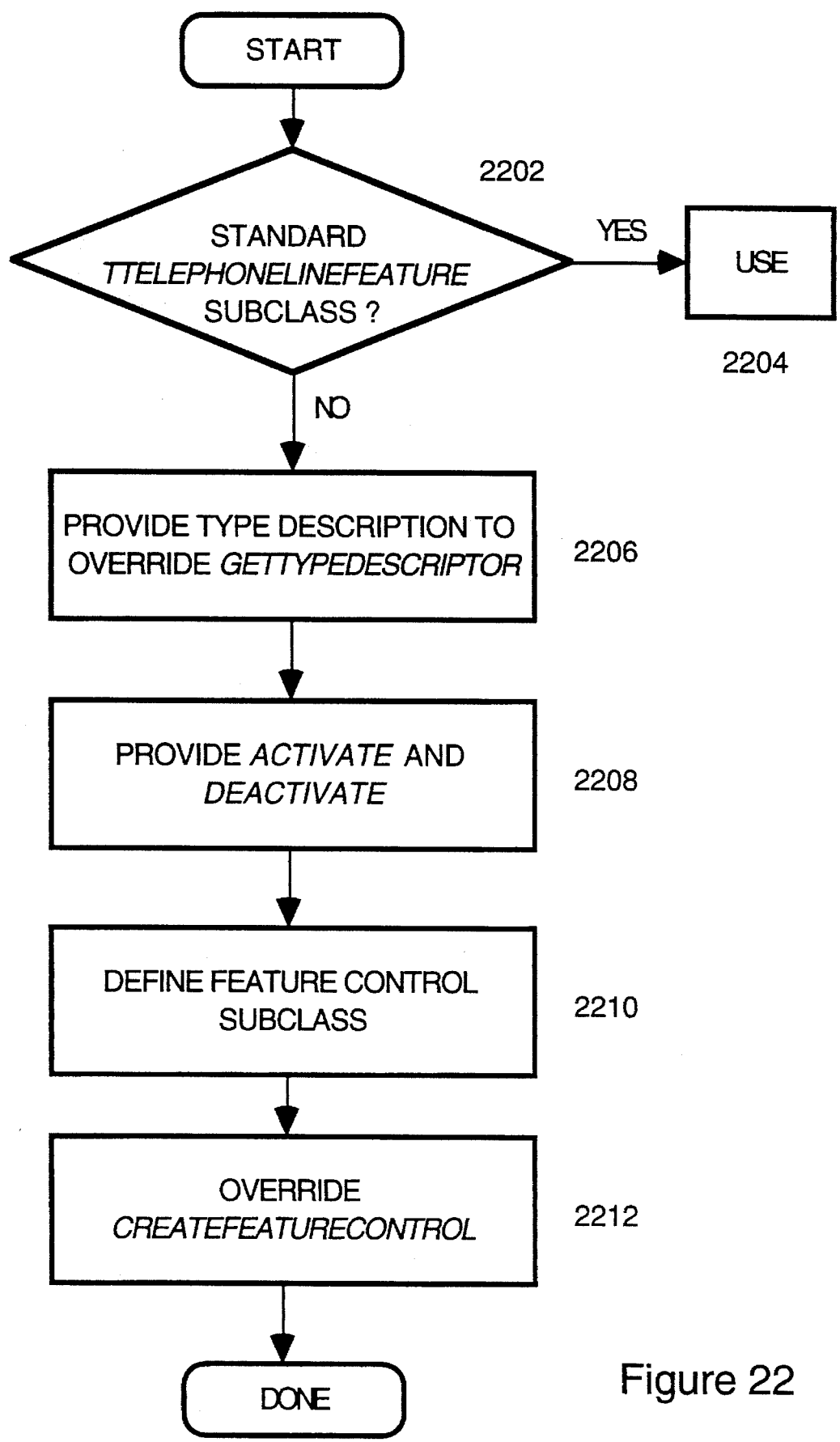
FIG. 22 shows a development cycle for a designer of telephony equipment in accordance with a preferred embodiment.

FIG. 22 shows the procedures which are followed if there are advanced features for which no standard TTelephoneLineFeature subclass exists 2202. At 2204, if the feature is standard, it is used. If the feature is not standard, it is up to the developer to provide a type description at 2206 by overriding the pure virtual member function GetTypeDescription and to provide implementations of Activate and Deactivate 2208. The developer must also define a feature control subclass 2210 to present to line handles and must override CreateFeatureControl 2212 so that it returns an instance of the control.

Telephone Configuration

The present invention employs two types of configuration information. Conversion from a displayable to a dialable number, for example, requires that the local area code be known, as well as the prefix for accessing long distance service. Information of this category may vary from location to location, but is common to all telephone lines installed at a given site. The local telephone number, on the other hand, and the features available to the extension associated with that number, are pieces of information which vary from line to line within the same site.

In a corporate setting, site-specific configuration information might be provided by a system administrator and included with the installation package distributed to individual users. Users would still have to specify the line-specific configuration. Non-corporate users would be responsible for providing both sets of information. The actual display and collection of configuration data may require that the developer produce either a special application or a data model capable of collecting input.

Configuration information is represented by TTelephoneLineConfigurationData, a lightweight configuration class which contains all site and line-specific configuration data required by a given TTelephoneLine. A similar relationship obtains between TTelephoneHandsetConfigurationData and TTelephoneHandset. These two classes are described in the preceding section.

Audio Objects

If a developer's TTelephoneLine subclass is capable of capturing and reproducing actual voice signals, it is up to the telephony developer to provide the audio classes required to support this capability via the Sound Server. A developer interested in providing audio I/O from an ISDN card, for example, would write MAudio/TAudioProcessor pairs to represent the input and output capability of that hardware.

Programming Interface for Telephony Developers

This section describes in detail the classes and member functions of the developer's tools introduced in the previous section. Developers who want to implement standard functions and features for a specific telephony environment will subclass TTelephoneLine as well as the standard TTelephoneLineFeature and TTelephoneLineFeatureControl subclasses. Developers who want to add new features and functions will need additional subclasses of TTelephoneLineFeature and TTelephoneLineFeatureControl. Developers who must support specialized terminal equipment will write subclasses of TTelephoneHandset and TTelephoneHandset Handle.

TTelephoneLine

Figure 23:
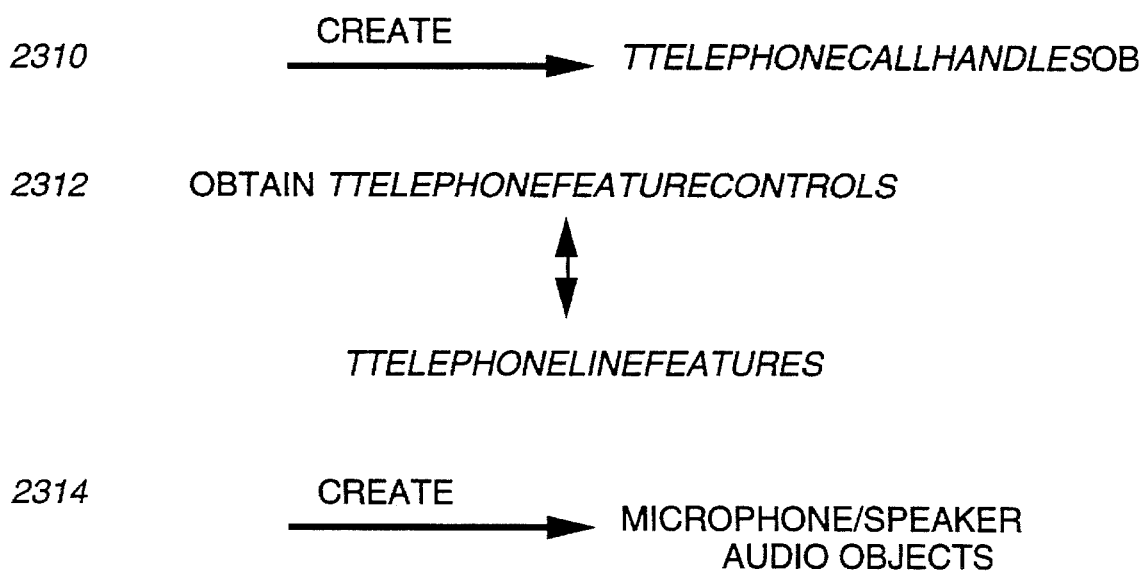
FIG. 23 shows the functional characteristics of TTelephoneLine in accordance with a preferred embodiment.

FIG. 23 shows the functional actions of TTelephoneLine 2300. This is the basic object representing a telephone line. It provides a low-level interface to simple telephone network functionality. Functions include: TakeOffHook 2302, PutOnHook 2304, DialNumber 2306, SendDigits 2308. The line creates TelephoneCallHandles 2310 to represent connections, obtains TTelephoneFeatureControls 2312 from its set of TTelephoneLineFeatures, and may also be capable of creating microphone and speaker audio objects 2314. A TTelephoneLine is associated with one or more surrogate objects called TTelephoneLineHandles. Handles relay requests to their master line, which, in turn, distributes telephone hook, ring, call, feature and digit notifications to the line handles. Advanced features such as hold, drop, transfer, conference are supported via subclasses of TTelephoneLineFeature. TTelephoneLine has been designed to be safely shared by handles belonging to different teams.

```
class TTelephoneLine : protected MRemoteDispatcher,
                      public MDelegatingNotification,
                      private MReferenceCounted
//Public Destructor
virtual        ~TTelephoneLine( );
//Public Access Functions
//Specify the Configuration of This Line
//Note: Client May Want to Change Configuration of an Existing Line
virtual void SetConfigurationData(const
                                  TTelephoneLineConfigurationData&);
//Create and Return Configuration for This Line
virtual TTelephoneLineConfigurationData* CreateConfigurationData( ) const;
//Protected Constructors
//Specifies Local Configuration Information
TTelephoneLine(const TTelephoneLineConfigurationData&);
//Copy Constructor
TTelephoneLine(const TTelephoneLine&);
//Default Constructor - Use For Streaming Only
TTelephoneLine( );
//Protected Assignment Operator
```

-continued

```
        TTelephoneLine&        operator=(const TTelephoneLine&);
//Subclass Interface
    //Add a Feature Object to the Feature List
    //Line Subclasses Should Create and Adopt Features in Their Constructor
    virtual    void            AdoptFeature(TTelephoneLineFeature*);
    //Specify Feature Type(s) for Which This Line Instance is Configured
    //Must be Called in Constructor After Features have been Adopted
    //Generates Exception of Feature to be configured Does Not Exist
    virtual    void            ConfigureFeatures(const TCollection&);
    //Update Line and Propagate Notification in Response to External Events
    virtual    void            ReceiveUpdate(TNotification&);
    //Setter for Hook Status
    virtual    void            SetHookStatus(const TToken&);
//Process Requests from Handle - These member functions are protected
//Note: Specific implementations for the following 4 pure virtual functions
//      must be provided for actual telephone hardware to be used
    //Take Line Off-Hook
    virtual    void            TakeOffHook( ) =0;
    //Put Line On-Hook
    virtual    void            PutOnHook( ) =0;
    //Dial Fully Specified Phone Number
    virtual    void            DialNumber(const TPhoneNumber&) =0;
    //Send Out Raw DTMF Digits
    virtual    void            SendDigits(const TPhoneCharacters&) =0;
//The Remaining protected request handlers have default implementations:
    //Place Call as Atomic Function - Default Implementation is Provided
    virtual TTelephoneCallHandle*      CreateAndPlaceCall(const TPhoneNumber&);
    //Answer Call as Atomic Function - Default Implementation is Provided
    virtual TTelephoneCallHandle*      CreateAndAnswerCall( );
    //Return Handles for All Calls In Progress on This Line
    virtual    void            CreateCallList(TCollection&) const;
    //Return Current Hook Status
    virtual    TToken          UpdateHookstatus( ) const;
    //Return Current Status of Specified Call
    virtual    TToken          UpdateCallStatus(const TTelephoneCallHandle&);
    //Return Feature Control Object Corresponding to Requested Feature Type
    virtual TTelephoneLineFeatureControl* CreateFeatureControl(
const TTypeDescription&) const;
//Protected Audio I/O Functions
    //Create Speaker and Microphone Audio Objects of appropriate type
    virtual    TSpeaker*       CreateSpeaker( ) = 0;
    virtual    TMicrophone*    CreateMicrophone( ) = 0;
//Protected Call Management Functions
    //Create a New Connection
    virtual    TTelephoneCallHandle*    AddCallAndCreateHandle(
                                        const TPhoneNumber&);
    //Locate Handle for Call Which Matches Specified State
    virtual    TTelephoneCallHandle*    FindCallAndCreateHandle(
                                        const TToken& callState) const;
    //Eliminate an Existing Connection
    virtual    void            DeleteCall(const TTelephoneCallHandle&);
//Protected Feature Management Functions
    //Locate Feature of Specified Type
    virtual TTelephoneLineFeature* GetFeature(
                                const TTypeDescription& featureType) const;
//Protected Functions for Generating Notifications
    virtual TNotification* CreateHookNotification(const TToken& hookState,
TTelephoneStatusNotification::ETelephoneStatusClassification
        classification =TTelephoneStatusNotification::kSuccess) const;
    virtual TNotification* CreateRingNotification(const TPhoneNumber&)
                                        const;
    virtual TNotification* CreateCallNotification(const TToken& callState,
        const TTelephoneCallHandle&,
        TTelephoneStatusNotification::ETelephoneStatusClassification
        classification =TTelephoneStatusNotification::kSuccess) const;
    virtual TNotification* CreateFeatureNotification(const TToken&
        featureState, const TTelephoneLineFeature&,
        TTelephoneStatusNotification::ETelephoneStatusClassification
        classification =TTelephoneStatusNotification::kSuccess) const;
    virtual TNotification* CreateDigitsNotification(const TPhoneCharacters&)
                                        const;
//Public MCollectible Overrides
    VersionDeclarationsMacro(TTelephoneLine);
    virtual    long            Hash( ) const;
    virtual    Boolean         IsEqual(const MCollectible*) const;
//Protected Streaming Operators Should Only Be Called By Subclasses
    virtual    TStream&        operator<<=(TStream& fromWhere);
    virtual    TStream&        operator>>=(TStream& toWhere) const;
```

TTelephoneHandset

Figure 24:
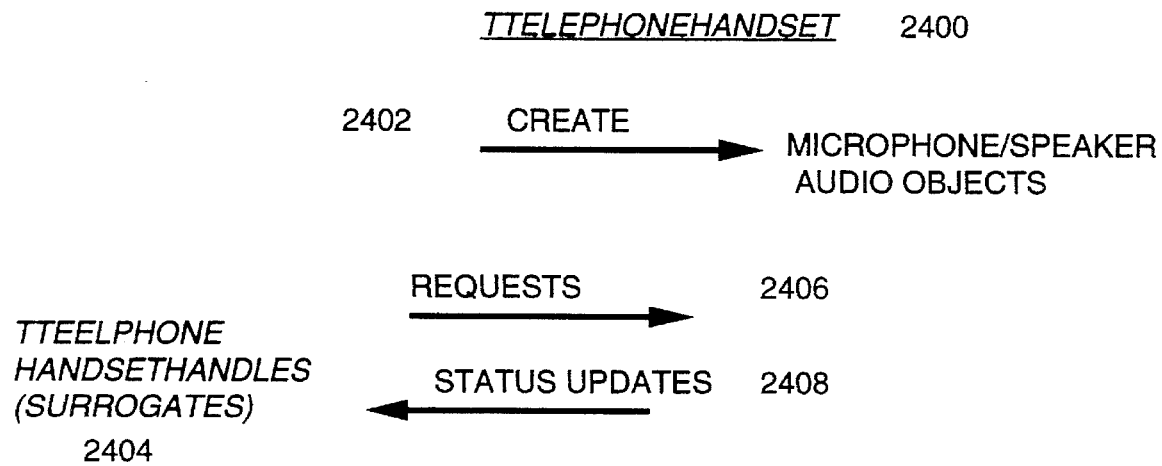
FIG. 24 shows the functional characteristics of TTelephoneLineHandset in accordance with a preferred embodiment.

FIG. 24 shows the functional flows performed by TTelephoneHandset 2400. This is the basic object representing a physical telephone handset. It may also be capable of creating microphone and speaker audio objects 2402. A TTelephoneHandset 2400 is associated with one or more surrogate objects called TTelephoneHandsetHandles 2404. Handles relay requests 2406 to their master handset, which, in turn, distributes status updates 2408 to handles. TTelephoneHandset 2400 has been designed to be safely shared by handles belonging to different teams.

```
class TTelephoneHandset : protected MRemoteDispatcher,
                                    public MDelegatingNotifier,
                                    public MReferenceCounted
//Public Destructor
virtual       ~TTelephoneHandset( );
//Public Access Functions
//Specify the Configuration of This Handset
//Note: Client May Want to Change Configuration of an Existing Line
virtual void SetConfigurationData(const TTelephoneHandsetConfigurationData&);
//Create and Return Configuration for This Handset
virtual TTelephoneHandsetConfigurationD* CreateConfigurationData( ) const;
//Protected Constructors
//Specifies Local Configuration Information
TTelephoneHandset(const TTelephoneHandsetConfigurationData&);
//Copy Constructor
TTelephoneHandset(const TTelephoneHandset&);
//Default Constructor - Use For Streaming Only
TTelephoneHandset( );
//Assignment Operator
TTelephoneHandset& operator=(const TTelephoneHandset&);
//Sub-Class Interface
    //Update Line and Propagate Notification in Response to External Events
    virtual   void                 ReceiveUpdate(TNotification&);
    //Protected Setter for Hook Status
    virtual   void                 SetHookStatus(const TToken& theStatus);
    //Locate Connectable Telephone Line Using Specified Configuration
    //This function has been provided to facilitate implementation of the
    //"ConnectToTelephoneLine" pure virtual function
    virtual   TTelephoneLine* FindLine(
                                   const TTelephoneLineConfigurationData&);
//Process Requests from Handle - These Member Functions are Protected
//Note: Specific implementations for the following 2 pure virtual functions
//      must be provided for actual telephone hardware to be used
    //Connect to Line Specified by Configuration Data
    //Connectability Verification, Connection State Maintenance Done
    //Automatically
    virtual void ConnectToTelephoneLine(const TTelephoneLineHandle&) = 0;
    //Disconnect from Currently Associated Line
    //Connection State Maintained Automatically
    virtual void DisconnectFromTelephoneLine( ) =0;
//The Remaining protected request handlers have default implementations:
    //Getter for Hook Status
    virtual   TToken               UpdateHookStatus( ) const;
    //Getter for Connection Status
    virtual   Boolean              UpdateConnectionStatus( ) const;
    //Get Configuration Data for Currently Connected Telephone Line
    //At Any Time, Handset may be Connected to Zero or One of These Lines
    virtual TTelephoneLineConfigurationData* CreateLineConfigurationData( )
                                                    const;
    //Create Configuration Data Objects for All Telephone Lines to Which
    //Handset Can Be Connected
    virtual void CreateConnectibleLineConfigurations(TCollection&) const;
//Protected Audio I/O Functions
    //Create Speaker and Microphone Audio Objects of appropriate type
    //Note: These Objects Represent the Local Audio I/O Capability of the
    //Handset and Not of the Telephone Line to Which it is Connected
    virtual   TSpeaker*     CreateSpeaker( ) =0;
    virtual   TMicrophone*  CreateMicrophone( ) =0;
//Protected Functions for Generating Notifications
    virtual TNotification* CreateHookNotification(const TToken& hookState,
    TTelephoneStatusNotification::ETelephoneStatusClassification
         classification =TTelephoneStatusNotification::kSuccess) const;
    virtual TNotification* CreateRingNotification(const TPhoneNumber&)
                                                    const;
//Public MCollectible Overrides
    VersionDeclarationsMacro(TTelephoneHandset);
    virtual   long                 Hash ( ) const;
    virtual   Boolean              IsEqual (const MCollectible*) const;
//Protected Streaming Operators Should Only Be Called By Subclasses
    virtual   TStream&             operator<<=(TStream& fromWhere);
    virtual   TStream&             operator>>=(TStream& toWhere) const;
```

TTelephoneLineFeature

Figure 25:
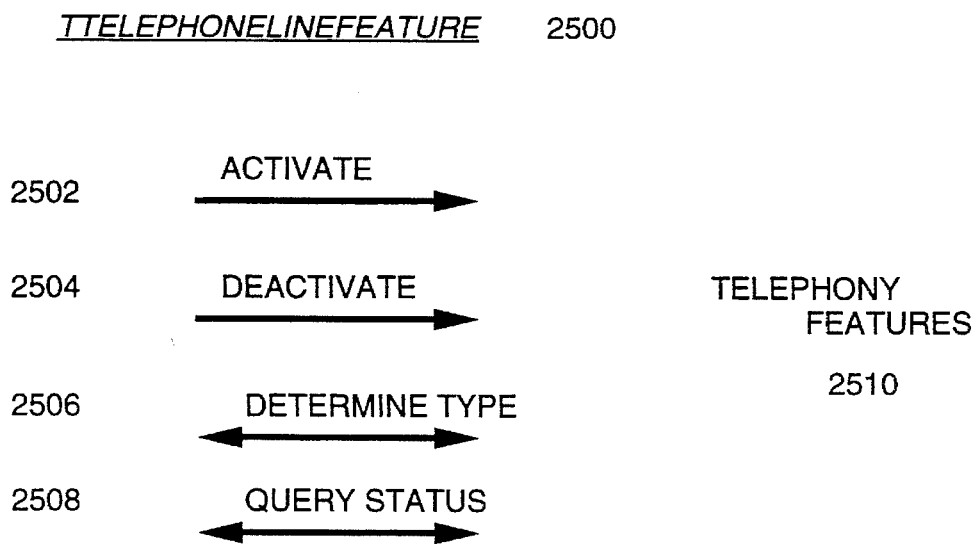
FIG. 25 shows the functional aspects of TTelephoneLineFeature in accordance with a preferred embodiment.

FIG. 25 shows the functions of TTelephoneLineFeature 2500. TTelephoneLineFeature is a base class which defines a standard set of advanced Telephone Line features. It defines a protocol for polymorphically Activating and Deactivating 2504 advanced telephony features 2510 and provides methods for determining their type 2506 and querying their status fields 2508. TTelephoneLineFeature is not multithread safe, but is accessed in a safe manner by the Line.

```
class TTelephoneLineFeature : protected MRemoteDispatcher
//Public Destructor
    virtual   ~TTelephoneLineFeature( );
//Public Access Functions
    //Return Feature Type Description - Pure Virtual Function
    virtual   void              GetFeatureType(TTypeDescription&) const =0;
    //Return Current Feature Status
    virtual   TToken            UpdateStatus( ) const;
    //Create Matching Control Object
    //Pure Virtual Member Function - Must Be Overridden
    virtual TTelephoneLineFeatureControl* CreateFeatureControl( ) const =0;
//Protected Constructors
    //For Use By Subclasses - Defaults to Deactivated State
    TTelephoneLineFeature( );
    //Copy Constructor
    TTelephoneLineFeature(const TTelephoneLineFeature&);
//Protected Assignment Operator
    TTelephoneLineFeature&      operator=(const TTelephoneLineFeature&);
//Subclass Interface
    //Activate/Deactivate the Feature Polymorphically
    //Pure Virtual Functions - Must Be Overridden
    virtual   void              Activate( ) =0;
    virtual   void              Deactivate( ) =0;
//Public MCollectible Overrides
    VersionDeclarationsMacro(TTelephoneLineFeature);
    virtual   long              Hash( ) const;
    virtual   Boolean           IsEqual(const MCollectible*) const;
//Protected Streaming Operators Should Only Be Called By Subclasses
    virtual   TStream&          operator<<=(TStream& fromWhere);
    virtual   TStream&          operator>>=(TStream& toWhere) const;
```

Standard TTelephoneLineFeature Subclasses

```
• Hold Feature:
class TTelephoneHoldFeature : public TTelephoneLineFeature
//Destructor
    virtual   ~TTelephoneHoldFeature( );
//TTelephoneLineFeature Overrides
    //Return Standard Hold Type Description
    virtual   void          GetFeatureType(TTypeDescription&) const;
    //Return Standard Hold Control Object
    virtual   TTelephoneFeatureControl* CreateFeatureControl( ) const;
//Protected Constructors
    TTelephoneHoldFeature( );
    TTelephoneHoldFeature(const TTelephoneHoldFeature&);
• Drop Feature:
class TTelephoneDropFeature : public TTelephoneLineFeature
//Public Destructor
    virtual   ~TTelephoneDropFeature( );
//TTelephoneLineFeature Overrides
    //Return Standard Drop Type Description
    virtual   void          GetFeatureType(TTypeDescription&) const;
    //Return Standard Drop Control Object
    virtual   TTelephoneFeatureControl* CreateFeatureControl( ) const;
//Protected Constructors
    TTelephoneDropFeature( )
    TTelephoneDropFeature(const TTelephoneDropFeature&);
• Transfer Feature:
class TTelephoneTransferFeature : public TTelephoneLineFeature
//Destructor
    virtual   ~TTelephoneTransferFeature( );
//TTelephoneLineFeature Overrides
```

-continued

```
        //Return Standard Transfer Type Description
        virtual    void           GetFeatureType(TTypeDescription&) const;
        //Return Standard Transfer Control Object
        virtual    TTelephoneFeatureControl* CreateFeatureControl( ) const;
//Protected Constructors
        TTelephoneTransferFeature( );
        TTelephoneTransferFeature(const TTelephoneTransferFeature&);
• Conference Feature:
class TTelephoneConferenceFeature : public TTelephoneLineFeature
Destructor
        virtual    ~TTelephoneConferenceFeature( );
//TTelephoneLineFeature Overrides
        //Return Standard Conference Type Description
        virtual    void           GetFeatureType(TTypeDescription&) const;
        //Return Standard Conference Control Object
        virtual    TTelephoneFeatureControl* CreateFeatureControl( ) const;
//Protected Constructors
        TTelephoneConferenceFeature( );
        TTelephoneConferenceFeature(const TTelephoneConferenceFeature&);
• Forward Feature:
class TTelephoneForwardFeature : public TTelephoneLineFeature
//Public Destructor
        virtual    ~TTelephoneForwardFeature( );
//TTelephoneLineFeature Overrides
        //Return Standard Forward Type Description
        virtual    void           GetFeatureType(TTypeDescription&) const;
        //Return Standard Forward Control Object
        virtual TTelephoneFeatureControl* CreateFeatureControl( ) const;
//Protected Constructors
        TTelephoneForwardFeature( );
        TTelephoneForwardFeature(const TTelephoneForwardFeature&);
```

TTelephoneLineHandle

The constructor, destructor, and some other member functions of this class have already been described in the section on the interface for application writers. The following low-level control functions provided by TTelephoneLineHandle may be useful when authoring a TTelephoneLineFeatureControl subclass.

```
//Take Line Off-Hook
virtual  void         TakeOffHook( );
//Put Line On-Hook
virtual  void         PutOnHook( );
//Dial Fully Specified Phone Number
virtual  void         DialNumber(const TPhoneNumber&);
//Send Out Raw DTMF Digits
virtual  void         SendDigits(const TPhoneCharacters&);
```

TTelephoneFeatureControl

The following is a similar list of functions for TTelephoneFeatureControl. These are used internally to implement the feature-specific protocol of the control. The pointer returned by GetLineHandle gives the control access to the public member functions of its associated line handle.

```
//Send Activation/Deactivation Request to Corresponding Feature Object
virtual         void         Activate( );
virtual         void         Deactivate( );
//Return Reference to Call's Line Handle
TTelephoneLineHandle*  GetLineHandle( ) const;
```

Audio Considerations

Interaction with the public telephone network itself is typically intermittent and relatively slow, thus imposing few, if any, strict performance constraints. Presence of audio data, on the other hand, brings in the standard set of real-time requirements that go along with analog-to-digital and digital-to-analog conversion hardware. Failure to keep up with the demands of such hardware introduces undesirable data discontinuities which not only degrade the intelligibility of speech data but can be extremely unpleasant (if not painful) to listen to. These real-time requirements, however, should not compromise the performance of non-real-time processes such as user interface widgets.

Specifically, recording or playing back one channel of audio does not provide any noticeable adverse effects upon such standard user operations as (a) selecting a menu item, (b) typing a character, (c) selecting a graphic object or (d) a range of text. This should be possible under each of the following scenarios:

1) 8 KHz log-companded samples captured from telephone handset and recorded to disk
2) 8 KHz log-companded samples captured from telephone network and recorded to disk
3) 8 KHz log-companded samples retrieved from disk and played back to handset
4) 8 KHz log-companded samples retrieved from disk and played back to network 5) 8 KHz log-companded samples retrieved from disk and played back to system speaker
6) 22 KHz linear samples retrieved from disk and played back to handset
7) 22 KHz linear samples retrieved from disk and played back to network Scenarios 5 through 7 require sample rate conversion with simultaneous companded-to-linear or linear-to-companded conversion.

In order for the present invention to operate with audio objects, the telephony objects support a variety of standards. For example, it is contemplated that both the μ-Law and the A-Law formats as well as providing for conversion to and from the standard audio format(s) is supported by target machines. By providing the capability of interacting with audio objects, the boundary between the telephony world and the generic sound world appears smooth and "seamless". It would be possible to instantiate via the Sound Server a standard microphone or speaker object which encapsulates the audio input or output capabilities of telephone lines and telephone handsets.

EXAMPLES in Accordance With A Preferred Embodiment

The above discussion provides a description of some exemplary objects which may be useful for interfacing with telephony equipment. Below provides examples using some of the objects discussed above.

```
Placing a Call:
...
//Create a New TTelephoneHandle.
//Line Configuration is a TTelephoneHandsetConfigurationData object
TTelephoneLineHandle myLineHandle(lineConfiguration);
//Create a New Call Object
TPhoneNumber myNumber =TPhoneNumber("974-0001")
TTelephoneCallHandle* myPhoneCall =myLineHandle.CreateAndPlaceCall(myNumber);
...
//OK, time to get off the phone
myPhoneCall.HangUp( );
delete myPhoneCall;
Answering a Call:
...
//For the Sake of the Example We'll Declare A Special Class
//to Receive the Ring Notification
class TRingHandler
{
public:
    TRingHandler (const TTelephoneLineHandle*);
virtual  ~TRingHandler( );
virtual  void      HandleRing(const TTelephoneRingNotification&);
private:
TTelephoneLineHandle*        fLineHandle;
TTelephoneCallHandle*        fCallHandle;
TMemberFunctionConnection    fConnection,
}
//The Definition of TRingHandler Would Then Be As Follows
TRingHandler::TRingHandler(const TTelephoneLineHandle* lineHandle)
              : fLineHandle(lineHandle)
{
    fConnection.SetReceiver(this, (NotificationMemberFunction)
          &TRingHandler::ReceiveEvent);
        fConnection.AdoptInterest(fLineHandle->CreateRingInterest( ));
        fConnection.Connect( );
}
TRingHandler::~TRingHandler( )
{ }
TRingHandler::HandleRing(const TNotification& ringNotification)
{
        //Before the Call is Connected, We Can Ask Who Is Calling
        TPhoneNumber callingParty;
        ((const TTelephoneRingNotification&)
                theNotification).GetIncomingNumber(callingParty);
        //Go Ahead and Answer It
        fCallHandle =fLineHandle->CreateAndAnswerCall( )
}
Putting a Call On Hold:
...
//Create a New TTelephoneHandle as Above
TTelephoneLineHandle myLineHandle(lineConfiguration);
//Negotiate for Hold Feature
//In Real Life, This Would Be Done with Surrogate Before Instantiating Line
TDeque featureList;
TTypeDescription holdFeatureType;
TTelephoneLineFeatureControl::GetHoldFeatureType(holdFeatureType)
featureList.AddLast(&holdFeatureType);
TTypeDescription* featureType =myLineHandle.ChoosePreferredType(featureList);
Boolean canHold =(featureType !=NIL);
//Create a New Call Object
```

```
TPhoneNumber myNumber =TPhoneNumber("974-0001")
TTelephoneCallHandle* myPhoneCall =myLineHandle.CreateAndPlaceCall(myNumber);
...
//OK, the Call's Now Active So Put It On Hold
if ((myPhoneCall->GetStatus( ) ==TTelephoneStatusNotification::kCallActive)
        && (canHold)) {
    TTelephoneFeatureControl* holdControl;
    holdControl =myLineHandle.CreateFeatureControl(holdFeatureType);
    holdControl->PutOnHold( );
...
    //He's Suffered Long Enough. Let's Reconnect Him.
    holdControl->Reconnect(myPhoneCall);
    }
...
Adding a New Telephone Feature:
//----------------------------------------------------------------
//    TFancyFeature - Declaration
//----------------------------------------------------------------
class TFancyFeature : public TTelephoneLineFeature {
public:
//Constructors
    TFancyFeature( );
    TFancyFeature(const TFancyFeature&);
//Destructor
    virtual    ~TFancyFeature( );
//Assignment Operator
    TFancyFeature&    operator=(const TFancyFeature&);
//TTelephoneLineFeature Overrides
    //Return Fancy Feature Type Description
    virtual    void          GetFeatureType(TTypeDescription&) const;
    //Return Fancy Feature Control Object
    virtual    TTelephoneFeatureControl* CreateFeatureControl( ) const;
    //Activate Feature
    virtual    void          Activate( );
    //Deactivate Feature
    virtual    void          Deactivate( );
//MCollectible Overrides
MCollectibleDeclarationsMacro(TFancyFeature);
    virtual    long          Hash( ) const;
    virtual    Boolean       IsEqual(const MCollectible*) const;
    virtual    TStream&      operator<<=(TStream& fromWhere);
    virtual    TStream&      operator>>=(TStream& toWhere) const;
}
//----------------------------------------------------------------
//    MFancyFeature - Definition
//----------------------------------------------------------------
//Constructor implementation
TFancyFeature::TFancyFeature( )
{ }
//Destructor Implementation
TFancyFeature::~TFancyFeature( )
{ }
//Return Fancy Feature Type Description
void    GetFeatureType(TTypeDescription& featureType) const
{
    TFancyFeatureControl::GetFancyFeatureType(featureType);
}
//Create Fancy Feature Control
TTelephoneFeatureControl* TFancyFeature::CreateFeatureControl( ) const
{
    TTelephoneFeatureControl* fancyControl =new TFancyFeatureControl( );
    return fancyControl;
}
//Activate Feature
void        TFancyFeature::Activate( )
{
    //Do Actual Work to Activate Feature
}
//Deactivate Feature
void        TFancyFeature::Deactivate( )
{
    //Do Actual Work to Deactivate Feature
}
//MCollectible Overrides
MCollectibleDefinitionsMacro(TFancyFeature,0);
...
//----------------------------------------------------------------
//    TFancyFeatureControl - Declaration
//----------------------------------------------------------------
```

```
class TFancyFeatureControl: public TTelephoneFeatureControl {
public:
static const void GetFancyFeatureType(TTypeDescription&);
//Destructor
    virtual         ~TFancyFeatureControl( );
//TTelephoneLineFeatureControl Override
    //Return Feature Type Description
    virtual   void        GetFeatureType(TTypeDescription&) const;
//Client Interface
    //Access the Feature - May Need to Pass Line or Call Handle Parameter
    virtual   void        TuurnOnFancyFeature( );
    virtual   void        TurnOffFancyfeature( );
    //MCollectible Overrides
    MCollectibleDeclarationsMacro(TFancyFeatureControl);
    virtual   long        Hash( ) const;
    virtual   Boolean     IsEqual(const MCollectible) const;
protected:
    virtual   TStream&    operator<<=(TStream& fromWhere);
    virtual   TStream&    operator>>=(TStream& toWhere) const;
//Constructors
    //Initialize with Values From Specified Feature
    TFancyFeatureControl(const TFancyFeatureControl&);
    //Copy Constructor
    TFancyFeatureControl(const TFancyFeatureControl&);
    //Default Constructor Called by TFancyFeature
    TFancyFeatureControl( );
    //Assignment Operator
    TFancyFeatureControl& operator=(const TFancyFeatureControl&);
//Only a TFancyFeature Can Construct This Class
    friend class TFancyFeature;
};
//--------------------------------------------------------------------------
//    TFancyFeatureControl - Definition
//--------------------------------------------------------------------------
const void TTelephoneLineFeatureControl::GetFancyFeatureType
                        (TTypeDescription& featureType)
{
    static const TTypeDescription fancyType("BrandXFancyFeature");
    featureType =fancyType;
}
//Destructor
TFancyFeatureControl::~TFancyFeatureControl( )
//Return Feature Type Description
void      TFancyFeatureControl::GetFeatureType(TTypeDescription& featureType) const
{
    GetFancyFeatureType(featureType);
}
//Client Interface
void      TFancyFeatureControl::TurnOnFancyFeature( )
{
    Activate( );
}
void      TFancyFeatureControl::TurnOffFancyFeature( )
{
    Deactivate( );
}
//MCollectible Overrides
MCollectibleDefinitionsMacro(TFancyFeatureControl,0);
//Constructors
//Initialize with Values From Specified Feature
TFancyFeatureControl::TFancyFeatureControl(const TFancyFeature& theFeature)
            :TTelephoneLineFeatureControl(theFeature)
{
}
//Copy Constructor
TFancyFeatureControl::TFancyFeatureControl(const TFancyFeatureControl& source)
            :TTelephoneLineFeatureControl(source)
{
}
//Default Constructor Called for Streaming and Assignment Only
TFancyFeatureControl::TFancyFeatureControl( ) : TTelephoneLineFeatureControl( )
{
}
//Assignment Operator
TFancyFeatureControl&   TFancyFeatureControl::operator= (
                        const TFancyFeatureControl& source)
{
    //No Self-Assignment
    if (&source !=this) {
```

-continued

```
        TTelephoneFeatureControl:operator=(source);
    }
    return *this; }
Predefined Telephone Constants
Name                                                    Meaning
```

|  |  |
|---|---|
| Telephone Notification Interest Names | |
| TTelephoneInterest::kHookStatus | Hook Status Update |
| TTelephoneCallInterest::kCallStatus | Call Status Update |
| TTelephoneFeatureInterest::kFeatureStatus | Feature Status Update |
| TTelephoneInterest::kRingNotification | Notification of Incoming Call |
| TTelephoneInterest::kDigitsReceived | Notification of Incoming DTMF |
| Telephone Line States | |
| TTelephoneStatusNotification::kOnHook | Line is On Hook |
| TTelephoneStatusNotification::kOffHook | Line is off Hook |
| Telephone Call States | |
| TTelephoneStatusNotification::kCallIdle | Default State |
| TTelephoneStatusNotification::kIncompleteCallInfo | More Information Needed to Place Call |
| TTelephoneStatusNotification::kCallReorder | Call Placement Could Not Proceed |
| TTelephoneStatusNotification::kCallCannotComplete | Special Service Information Tone Detected |
| TTelephoneStatusNotification::kReadyToDial | Dialtone is Present |
| TTelephoneStatusNotification::kFastBusy | Dialtone Timeout |
| TTelephoneStatusNotification::kDialingComplete | Dialout Completed |
| TTelephoneStatusNotification::kRingbackDetected | Remote Connection is "ringing" |
| TTelephoneStatusNotification::kBusyDetected | Busy Received - Remote Phone is Busy |
| TTelephoneStatusNotification::kNoAnswer | Remote Phone has not been Answered |
| TTelephoneStatusNotification::kCallActive | Call has been Successfully Connected |
| TTelephoneStatusNotification::kCallOnHold | Call has been Put on Hold |
| TTelephoneStatusNotification::kCallTerminationDetected | Other Party has Terminated |
| Telephone Feature States | |
| TTelephoneStatusNotification::kActivateInProgress | Feature Activation Request Acknowledged |
| TTelephoneStatusNotification::kActivateComplete | Feature is Now Activated |
| TTelephoneStatusNotification::kCannotActivate | Feature Could Not Be Activated |
| TTelephoneStatusNotification::kDeactivate | Feature Deactivation Request Ack InProgress |
| TTelephoneStatusNotification::kDeactivateComplete | Feature is Now Deactivated |
| TTelephoneStatusNotification::kCannotDeactivate | Feature Could Not Be Deactivated |
| Generic Error State | |
| TTelephoneStatusNotification::kErrorState | Bad or Undefined State |

Basic Telephone Call State Machine

The following provides an implementation of a call state machine utilizing some of the objects discussed above.

```
Start State: kCallIdle [Outbound Call]
    Action: TTelephoneLineHandle::TakeOffHook            EndState: kReadyToDial
Start State: kCallIdle [Incoming Call]
    Action: TTelephoneLineHandle::TakeOffHook            EndState: kCallActive
Start State: kReadyToDial
    Event: kFastBusyDetected                             EndState: kFastBusyDetected
    Action: TTelephoneLineHandle::SendDigits             EndState: kDialingComplete
    Action: TTelephoneLineHandle::SendDigits             EndState: kIncompleteCallInfo
    Action: TTelephoneLineHandle::SendDigits             EndState: kCallReorder
    Action: TTelephoneCallHandle::HangUp                 EndState: kCallIdle
Start State: kFastBusyDetected
    Action: TTelephoneCallHandle::HangUp                 EndState: kCallIdle
Start State: kDialingComplete
    Event: kRingbackDetected                             EndState: kRingbackDetected
    Event: kBusyDetected                                 EndState: kBusyDetected
    Event: kCallCannotComplete                           EndState: kCallCannotComplete
    Action: TTelephoneCallHandle::HangUp                 EndState: kCallIdle
Start State: kIncompleteCallInfo
    Action: TTelephoneCallHandle::HangUp                 EndState: kCallIdle
Start State: kCallReorder
    Action: TTelephoneCallHandle::HangUp                 EndState: kCallIdle
Start State: kRingbackDetected
    Event: kCallActive                                   EndState: kCallActive
    Event: kNoAnswer                                     EndState: kNoAnswer
    Action: TTelephoneCallHandle::HangUp                 EndState: kCallIdle
Start State: kBusyDetected
    Action: TTelephoneCallHandle::HangUp                 EndState: kCallIdle
Start State: kCallCannotComplete
    Action: TTelephoneCallHandle::HangUp                 EndState: kCallIdle
Start State: TTelephoneLine::kCallActive
    Event: kCallIdle                                     EndState: kCallIdle
```

-continued

| | |
|---|---|
| Action: TTelephoneCallHandle::HangUp | EndState: kCallIdle |
| Start State: TTelephoneLine::kNoAnswer | |
| Action: TTelephoneCallHandle::HangUp | EndState: kCallIdle |

While the invention has been described in terms of a preferred embodiment in a specific system environment, those skilled in the art recognize that the invention can be practiced, with modification, in other and different hardware and software environments within the spirit and scope of the appended claims.

Having thus described our invention, what we claim as new, and desire to secure by Letters Patent is:

1. A telephony apparatus, comprising:
   (a) a processor;
   (b) a storage attached to and controlled by the processor;
   (c) an object oriented operating system, supporting encapsulation, polymorphism and inheritance, including objects, each of the objects containing logic and data resident in the storage and controlling operations of the processor;
   (d) a display attached to the processor under the control of the object oriented operating system;
   (e) a telephony element attached to the processor;
   (f) a telephony object, including logic for interfacing the telephony element to the processor and data for storing status information associated with the telephony element in the telephony object, and representative of the telephony element under the control of the object-oriented operating system, stored in the storage and displayed on the display; and
   (g) means for controlling the telephony element by the object oriented operating system utilizing the logic in the telephony object to interface the telephony element to the processor by initiating a call connection, monitoring call progress, activating call featurs and storing status information in the data of the telephony object.

2. The apparatus as recited in claim 1, including means for translating information received from the telephony element into information the object oriented operating system can utilize.

3. The apparatus as recited in claim 1, including means for translating information received from the telephony object into information the telephony element can utilize.

4. The apparatus as recited in claim 1, including means for attaching the telephony element to the processor.

5. The apparatus as recited in claim 4, including means for connecting a telephone line to the processor.

6. The apparatus as recited in claim 4, including means for connecting a handset to the processor.

7. The apparatus as recited in claim 4, including means for setting up a call to the processor.

8. The apparatus as recited in claim 4, including means for passing information between the telephony element and the processor.

9. The apparatus as recited in claim 8, including means for exchanging DTMF tones between the telephony element and the processor.

10. The apparatus as recited in claim 1, including means for enabling features of the telephony element via the telephony object.

11. The apparatus as recited in claim 1, including means for servicing queries between a telephony element and the object-oriented operating system.

12. The apparatus as recited in claim 1, including means for exchanging notification information between a telephony element and the object-oriented operating system.

13. A method for enabling telephony elements on a computer system, including a processor with an attached storage, display and telephony element, comprising the steps of:
   (a) controlling operations of the processor with an object oriented operating system, supporting encapsulation, polymorphism and inheritance, including objects, each of the objects containing logic and data resident in the storage;
   (b) creating a telephony object, including logic for interfacing the telephony element to the processor and data for storing status information associated with the telephony element in the telephony object, and representative of the telephony element under the control of the object-oriented operating system, stored in the storage and displayed on the display; and
   (c) controlling the telephony element by the object-oriented operating system utilizing logic in the telephony object to interface the telephony element to the processor by initiating a call connection, monitoring call progress, activating call features and storing status information in the data of the telephony object.

14. The method as recited in claim 13, including the step of translating information received from the telephony element into information the object oriented operating system can utilize.

15. The method as recited in claim 13, including the step of translating information received from the telephony object into information the telephony element can utilize.

16. The method as recited in claim 13, including the step of attaching the telephony element to the processor.

17. The method as recited in claim 16, including the step of connecting a telephone line to the processor.

18. The method as recited in claim 16, including the step of connecting a handset to the processor.

19. The method as recited in claim 16, including the step of setting up a call to the processor.

20. The method as recited in claim 16, including the step of passing information between the telephony element and the processor.

21. The method as recited in claim 20, including the step of exchanging DTMF tones between the telephony element and the processor.

22. The method as recited in claim 13, including the step of enabling features of the telephony element via the telephony object.

23. The method as recited in claim 13, including the step of exchanging status information between a telephony element and the object-oriented operating system.

24. The method as recited in claim 13, including the step of exchanging notification information between a telephony element and the object-oriented operating system.

* * * * *

(12) EX PARTE REEXAMINATION CERTIFICATE (8146th)
United States Patent
Dilts et al.

(10) Number: US 5,455,854 C1
(45) Certificate Issued: Apr. 12, 2011

(54) OBJECT-ORIENTED TELEPHONY SYSTEM

(75) Inventors: Michael R. Dilts, Saratoga, CA (US); Steven H. Milne, Palo Alto, CA (US); David B. Goldsmith, Los Gatos, CA (US)

(73) Assignee: Apple Inc., Cupertino, CA (US)

Reexamination Request:
No. 90/010,965, Apr. 28, 2010

Reexamination Certificate for:
Patent No.: 5,455,854
Issued: Oct. 3, 1995
Appl. No.: 08/108,877
Filed: Oct. 26, 1993

(51) Int. Cl.
*H04M 3/42* (2006.01)
*H04M 11/00* (2006.01)
*G06F 1/00* (2006.01)

(52) U.S. Cl. .................. 379/201.04; 379/201.03; 379/207.02; 379/93.17; 706/53; 706/917; 715/764; 715/839

(58) Field of Classification Search .................. None
See application file for complete search history.

(56) References Cited

U.S. PATENT DOCUMENTS

| | | | |
|---|---|---|---|
| 4,625,081 A | 11/1986 | Lotito et al. | |
| 4,635,208 A | 1/1987 | Coleby et al. | |
| 4,653,090 A | 3/1987 | Hayden | |
| 4,716,583 A | 12/1987 | Groner et al. | |
| 4,736,406 A | 4/1988 | Molnar | |
| 4,747,127 A | 5/1988 | Hansen et al. | |
| 4,785,408 A | 11/1988 | Britton et al. | |
| 4,791,550 A | 12/1988 | Stevenson et al. | |
| 4,805,209 A | 2/1989 | Baker, Jr. et al. | |
| 4,813,069 A | 3/1989 | Tanaka et al. | |
| 4,821,220 A | 4/1989 | Duisberg | |
| 4,860,342 A | 8/1989 | Danner | |
| 4,885,717 A | 12/1989 | Beck et al. | |
| 4,891,630 A | 1/1990 | Friedman et al. | |
| 4,899,373 A | 2/1990 | Lee et al. | |
| 4,907,260 A | 3/1990 | Prohs et al. | |
| 4,937,743 A | 6/1990 | Rassman et al. | |
| 4,943,996 A | 7/1990 | Baker, Jr. et al. | |
| 4,953,080 A | 8/1990 | Dysart et al. | |
| 5,041,992 A | 8/1991 | Cunningham et al. | |

(Continued)

FOREIGN PATENT DOCUMENTS

| | | |
|---|---|---|
| DE | 39 32 686 A1 | 4/1990 |
| DE | 41 31 380 A1 | 3/1993 |
| EP | 0 463 207 A1 | 1/1992 |
| EP | 0 468 913 A2 | 1/1992 |
| WO | WO 92/14314 | 8/1992 |

OTHER PUBLICATIONS

Sixtensson et al., Reuse in the Telecommunication Domain Using Object Oriented Technology and ADA, Jun. 1990, pp. 231–239, Washington Ada Symposium Proceedings (Exhibit B).

Cohen et al., Version Management in Gypsy, 1988, pp. 201–215, ACM (Exhibit C).

(Continued)

*Primary Examiner*—Deandra M Hughes

(57) ABSTRACT

A method and system for enabling a set of object interface application elements and telephony system elements. Particular objects may be chosen depending on which elements of the telephony system will need to be interfaced. A particular object is capable of interfacing with one or more elements of the telephony system. The elements of the telephony system may be any identifiable aspect of the telephony system. For example, the objects could represent a handset or a line. Less tangible elements can also be represented, such as signals or procedures, including call progress tones, call setup, call hold, conference calls, or other call features.

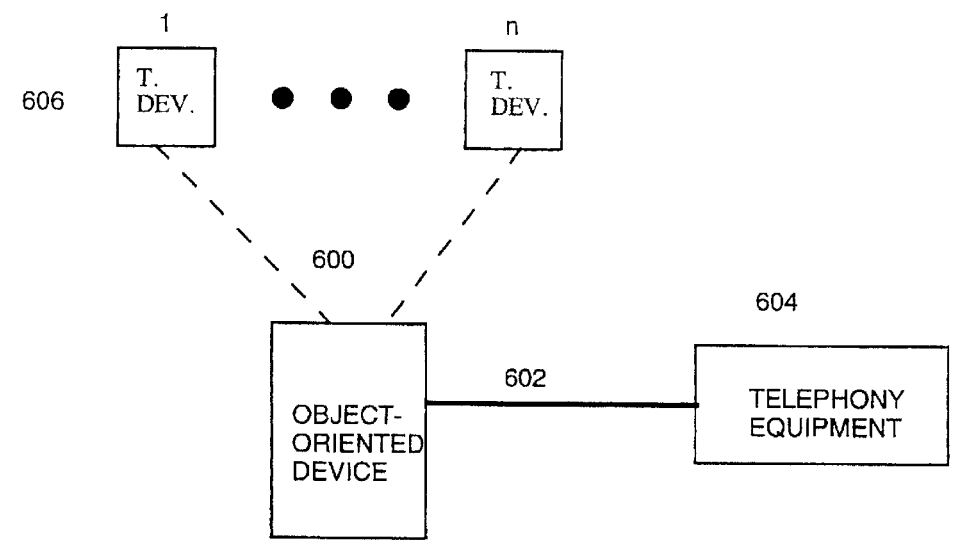

U.S. PATENT DOCUMENTS

| | | | |
|---|---|---|---|
| 5,046,188 A | 9/1991 | Molnar |
| 5,050,090 A | 9/1991 | Golub et al. |
| 5,060,276 A | 10/1991 | Morris et al. |
| 5,075,848 A | 12/1991 | Lai et al. |
| 5,093,914 A | 3/1992 | Coplien et al. |
| 5,119,475 A | 6/1992 | Smith et al. |
| 5,125,091 A | 6/1992 | Staas, Jr. et al. |
| 5,133,075 A | 7/1992 | Risch |
| 5,136,705 A | 8/1992 | Stubbs et al. |
| 5,151,987 A | 9/1992 | Abraham et al. |
| 5,161,225 A | 11/1992 | Abraham et al. |
| 5,164,981 A | 11/1992 | Mitchell et al. |
| 5,181,162 A | 1/1993 | Smith et al. |
| 5,195,130 A | 3/1993 | Weiss et al. |
| 5,224,153 A | 6/1993 | Katz |
| 5,241,588 A | 8/1993 | Babson, III et al. |
| 5,243,643 A | 9/1993 | Sattar et al. |
| 5,255,183 A | 10/1993 | Katz |
| 5,255,305 A | 10/1993 | Sattar |
| 5,274,738 A | 12/1993 | Daly et al. |
| 5,315,646 A | 5/1994 | Babson, III et al. |
| 5,323,452 A | 6/1994 | Dickman et al. |
| 5,384,829 A | 1/1995 | Heileman, Jr. et al. |
| 5,404,396 A | 4/1995 | Brennan |
| 5,414,812 A | 5/1995 | Filip et al. |
| 5,420,852 A | 5/1995 | Anderson et al. |
| 5,428,679 A | 6/1995 | French |
| 5,442,690 A | 8/1995 | Nazif et al. |
| 5,450,480 A | 9/1995 | Man et al. |
| 5,452,341 A | 9/1995 | Sattar |
| 5,455,903 A | 10/1995 | Jolissaint et al. |
| 5,479,487 A | 12/1995 | Hammond |
| 5,481,601 A | 1/1996 | Nazif et al. |
| 5,541,986 A | 7/1996 | Hou |

OTHER PUBLICATIONS

Nextstep, NeXTStep™ Object–Oriented Programming and The Objective C Language, Apr. 1993, Release 3, pp. xi–xvi, 1, 5 and 8–18, Addison–Wesley Publishing Company, Inc. (Exhibit D).

Nextstep, NeXTStep™ Programming Interface Summary, Apr. 1993, Release 3, pages Intro–1, 13 (1–7), Addison–Wesley Publishing Company, Inc. (Exhibit E).

Nextstep, NeXTStep™ General Reference, Nov. 1992, vol. 2, Addison–Wesley Publishing Company, Inc., pp. 13–(1–14, 16–36 and 38). (Exhibit F).

Adobe Systems Incorporated, Programming the Display PostScript® System with NeXTStep™, Nov. 1991, Addison–Wesley Publishing Company, Inc., pp. xxii, 1–4, 7 and 10. (Exhibit H).

Ljungblom, Fredrik, "A Service Management Systems for the Intelligent Network", Ericsson Review No. 1, 1990, pp. 32–41.

"NeXTSTEP General Reference vol. 1", NeXTSTEP Developer's Library Release 3, Addisson–Wesley Publishing Company, Nov. 1992, 1230 pages.

"NeXTSTEP General Reference vol. 2", NeXTSTEP Developer's Library Release 3, Addisson–Wesley Publishing Company, Nov. 1992, 1353 pages.

Rankin, Kathleen O., "Boost '93: dishing out healthly portions of reality", Sep. 1993, Bellcore Exchange, pp. 21–24.

Cohen, Ellis S. et al., "Version Management in Gypsy", Siemens Research & Technology Laboratories, 1988, pp. 201–215.

"NeXTSTEP Object–Oriented Programming and the Objective C Language", NeXSTEP Developer's Library Release 3, Addison–Wesley Publishing Company, Apr. 1993, pp. xi–xvi, 1, 5, and 8–18.

"NeXTSTEP Programming Interface Summary", NeXSTEP Developer's Library Release 3, Addison–Wesley Publishing Company, Apr. 1993, pp. 1, and 13–1–13–7.

"NeXTSTEP General Reference", vol. 2, NeXSTEP Developer's Library Release 3, Addison–Wesley Publishing Company, Nov. 1992, pp. 13–1–13–38.

"Programming the Display PostScript—System with NeXSTEP", Addison–Wesley Publishing Company, Nov. 1991, pp. xxii, xxiii, 1, 2, 3, 4, 7 and 10.

Sixtensson, Anders and Wenchuan Ye, "Reuse in the Telecommunications Domain Using Object Oriented Technology and ADA", May 4, 1990, pp. 231–239.

Sixtensson, Anders and Wenchuan Ye, "Reuse in the Telecommunication Domain Using Object Oriented Technology and ADA", Washington ADA Syposium Proceedings, Jun. 1990, pp. 231–239.

Arnold, E.C. et al., "Object Oriented Software Technologies Applied to Switching System Architectures and Software Development Processes", Proceedings of the International Switching Symposium 1990, "Innovations in Switching Technology", Stockholm, Sweden, May 28–Jun. 1, 1990, vol. 2, C3.3, pp. 97–106.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-24 is confirmed.

* * * * *